United States Patent
Kim et al.

(10) Patent No.: US 12,200,335 B2
(45) Date of Patent: Jan. 14, 2025

(54) CAMERA ACTUATOR AND CAMERA DEVICE COMPRISING SAME

(71) Applicant: LG INNOTEK CO., LTD., Seoul (KR)

(72) Inventors: Tae Gon Kim, Seoul (KR); Han Ul Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 102 days.

(21) Appl. No.: 18/000,043

(22) PCT Filed: May 26, 2021

(86) PCT No.: PCT/KR2021/095054
§ 371 (c)(1),
(2) Date: Nov. 28, 2022

(87) PCT Pub. No.: WO2021/242079
PCT Pub. Date: Dec. 2, 2021

(65) Prior Publication Data
US 2023/0209162 A1    Jun. 29, 2023

(30) Foreign Application Priority Data
May 29, 2020   (KR) .................. 10-2020-0065028

(51) Int. Cl.
*H04N 23/54* (2023.01)
*H04N 23/55* (2023.01)

(52) U.S. Cl.
CPC .............. *H04N 23/54* (2023.01); *H04N 23/55* (2023.01)

(58) Field of Classification Search
CPC ........ H04N 23/54; H04N 23/55; H04N 23/51; H04N 23/57; H04N 23/685; H04N 23/687;
(Continued)

(56) References Cited

U.S. PATENT DOCUMENTS 9,467,624 B2    10/2016  Yeo
2007/0092235 A1*  4/2007  Misawa ................. H04N 23/68
                                        348/E5.046
(Continued)

FOREIGN PATENT DOCUMENTS

KR   10-2010-0061229 A   6/2010
KR   10-2011-0025512 A   3/2011
(Continued)

OTHER PUBLICATIONS

Supplementary European Search Report dated Oct. 13, 2023 in European Application No. 21814395.6.
(Continued)

*Primary Examiner* — Abdelaaziz Tissire
(74) *Attorney, Agent, or Firm* — Saliwanchik, Lloyd & Eisenschenk

(57) ABSTRACT

According to an embodiment of the present invention, disclosed is a camera device comprising: a housing; a lens assembly including at least one lens; a driving unit for moving the lens assembly; a main substrate on which an image sensor is provided; and a first substrate and a second substrate electrically connected to the driving unit and arranged on facing side surfaces of the housing to be spaced apart from each other, wherein the main substrate includes a first connection member connected to the first substrate and a second connection member connected to the second substrate.

15 Claims, 24 Drawing Sheets

(58) Field of Classification Search
CPC .............. H04N 5/2257; H04N 5/23293; H04N 5/2252; H04N 5/23212; G03B 17/02; G03B 2205/0069; G03B 3/10; G03B 5/00; G03B 30/00; G03B 17/12; G03B 2205/0007; G02B 7/09; G02B 7/10; H01F 7/064; H01F 7/02; G06F 1/1686; H04M 1/0264

See application file for complete search history.

(56) References Cited

U.S. PATENT DOCUMENTS

| | | | |
|---|---|---|---|
| 2010/0289908 A1* | 11/2010 | Ke | H01L 27/14625 |
| | | | 348/208.6 |
| 2011/0249120 A1 | 10/2011 | Bingle et al. | |
| 2015/0049209 A1* | 2/2015 | Hwang | G02B 7/09 |
| | | | 348/208.11 |
| 2015/0201114 A1* | 7/2015 | Shin | H04N 23/51 |
| | | | 348/375 |
| 2016/0154204 A1* | 6/2016 | Lim | G02B 27/646 |
| | | | 359/557 |
| 2016/0170170 A1* | 6/2016 | Go | G02B 27/646 |
| | | | 359/557 |
| 2016/0299349 A1* | 10/2016 | Cho | G03B 5/02 |
| 2017/0160558 A1* | 6/2017 | Kim | H02K 33/00 |
| 2018/0316840 A1* | 11/2018 | Martin | H04N 23/687 |
| 2019/0137728 A1* | 5/2019 | Wan | H04N 23/54 |
| 2019/0162562 A1* | 5/2019 | Min | G02B 27/64 |
| 2021/0092297 A1* | 3/2021 | Smyth | H05K 1/028 |

FOREIGN PATENT DOCUMENTS

| | | |
|---|---|---|
| KR | 10-1349567 B1 | 1/2014 |
| KR | 10-2019-0060263 A | 6/2019 |
| KR | 10-2020-0012011 A | 2/2020 |

OTHER PUBLICATIONS

International Search Report dated Sep. 3, 2021 in International Application No. PCT/KR2021/095054.

* cited by examiner

CAMERA ACTUATOR AND CAMERA DEVICE COMPRISING SAME

CROSS-REFERENCE TO RELATED APPLICATIONS

This application is the U.S. national stage application of International Patent Application No. PCT/KR2021/095054, filed May 26, 2021, which claims the benefit under 35 U.S.C. § 119 of Korean Application No. 10-2020-0065028, filed May 29, 2020, the disclosures of each of which are incorporated herein by reference in their entirety.

TECHNICAL FIELD

The present disclosure relates to a camera actuator and a camera device including the same.

BACKGROUND ART

A camera is a device that takes a picture or video of a subject, and is mounted on a portable device, a drone, a vehicle, or the like. The camera device or camera module may have an image stabilization (IS) function of correcting or inhibiting image shakes due to a user motion in order to improve an image quality, an auto-focusing (AF) function of automatically adjusting a distance between an image sensor and a lens and thereby aligning a focal length of the lens, and a zooming function of increasing or decreasing the magnification of a distant subject through a zoom lens.

Meanwhile, the higher the pixel number, the higher the resolution of the image sensor, and the smaller the size of the pixel. As the pixel becomes smaller in size, the amount of light received during the same time decreases. Therefore, as the camera has a higher pixel number, image shakes caused by handshakes due to a slow shutter speed in a dark environment may appear more severe. As a representative IS technology, there is an optical image stabilizer (OIS) technology that corrects motion by changing a path of light.

A general OIS technology is capable of detecting a camera movement through a gyro sensor or the like and, based on the detected movement, tilting or moving the lens or tilting or moving the camera device including the lens and the image sensor. In the case that the lens or the camera device including the lens and the image sensor is tilted or moved for the OIS, it is necessary to additionally secure a space for tilting or moving in the vicinity of the lens or the camera device.

On the other hand, an actuator for the OIS may be disposed around the lens. In this case, the actuator for the OIS may include actuators in charge of tilting of two axes perpendicular to the optical axis Z, that is, an actuator in charge of X-axis tilting and an actuator in charge of Y-axis tilting.

However, due to the needs of ultra-slim and ultra-small camera devices, there is a large space constraint for arranging the actuators for the OIS, and it may be difficult to ensure a sufficient space where the lens or the camera device itself including the lens and the image sensor can be tilted or moved for the OIS. In addition, as the camera has a higher pixel number, it is desirable to increase the size of the lens to increase the amount of light received. However, there may be a limit in increasing the size of the lens due to a space occupied by the actuator for the OIS.

In addition, when the zooming function, the AF function, and the OIS function are all included in the camera device, there is a problem in that a magnet for the OIS and a magnet for the AF or zoom are disposed close to each other and cause magnetic field interference.

DISCLOSURE

Technical Problem

A technical problem to be solved by the present disclosure is to provide a camera actuator and a camera device having a reduced size through connection between each substrate disposed on a side surface and a main substrate.

In addition, the present disclosure is intended to provide a camera actuator and a camera device with improved reliability because a connection member located outward does not spread inward.

In addition, the present disclosure is intended to provide a camera actuator that can be reduced in size through an inwardly inclined connection area.

In addition, the present disclosure is intended to provide a camera actuator and a camera device applicable to ultra-slim, ultra-small, and high-resolution cameras.

The problem to be solved in embodiments is not limited to the above, and other objects or effects that can be understood from the technical solution or embodiments described below are also included.

Technical Solution

A camera device according to an embodiment of the present disclosure includes a housing; a lens assembly including at least one lens; a driving unit moving the lens assembly; a main substrate on which an image sensor is provided; and a first substrate and a second substrate electrically connected to the driving unit and spaced apart from each other on opposite side surfaces of the housing, wherein the main substrate includes a first connection member connected to the first substrate and a second connection member connected to the second substrate.

The driving unit may include a driving coil and a driving magnet positioned to face the driving coil, the driving coil includes a first coil disposed on a first side surface of the housing, and a second coil disposed on a second side surface of the housing, and the driving magnet includes a first magnet corresponding to the first coil, and a second magnet corresponding to the second coil.

A driving driver disposed on the main substrate may be further included, and the driving driver may be electrically connected to the first coil and the second coil.

A base unit surrounding the image sensor and the driving driver on the main substrate may be further included.

The first substrate may include a first main area and a first connection area in contact with an end of the first main area, and the second substrate may include a second main area and a second connection area in contact with an end of the second main area.

The first connection area may be inclined inward with respect to the first main area, the second connection area may be inclined inward with respect to the second main area, and a first separation distance between the first main area and the second main area may be greater than a second separation distance between the first connection area and the second connection area.

The first connection area may include a first connection terminal part disposed on an outer surface, and the second connection area may include a second connection terminal part disposed on an outer surface.

The main substrate may include a first substrate terminal part and a second substrate terminal part which are disposed on an upper surface thereof, the first connection area may overlap with the first substrate terminal part, and the second connection area may overlap with the second substrate terminal part.

The first connection member may be disposed between the first connection terminal part and the first substrate terminal part, and the second connection member may be disposed between the second connection terminal part and the second substrate terminal part.

The lens assembly may include a second lens assembly; and a first lens assembly disposed between the second lens assembly and the image sensor, and a first movement distance of the first lens assembly may be greater than a second movement distance of the second lens assembly.

The first connection member and the second connection member may include a conductive member.

A camera device according to an embodiment may include a housing; a lens assembly including at least one lens; a driving unit moving the lens assembly; a main substrate on which an image sensor is provided; a first substrate and a second substrate electrically connected to the main substrate; and a driving driver disposed on the main substrate, wherein the first substrate may be disposed on a first side surface of the housing, and the second substrate may be disposed on a second side surface opposite to the first side surface; and wherein the driving driver may be electrically connected to the driving unit.

The lens assembly may include a first lens assembly and a second lens assembly, the driving unit may include a first magnet disposed on one of the first lens assembly and the first substrate, and a first coil disposed on the other one, and the driving unit may further include a second magnet disposed on one of the second lens assembly and the second substrate, and a second coil disposed on the other one.

A first movement distance of the first lens assembly may be greater than a second movement distance of the second lens assembly.

The driving driver may be located in a region between the first substrate and the second substrate.

Advantageous Effects

According to an embodiment of the present disclosure, it is possible to implement a camera actuator and a camera device having a reduced size through connection between each substrate disposed on a side surface and a main substrate.

In addition, the present disclosure can implement a camera actuator and a camera device with improved reliability because a connection member located outward does not spread inward.

In addition, the present disclosure can implement a camera actuator that can be reduced in size through an inwardly inclined connection area.

In addition, the present disclosure is intended to provide a camera actuator and a camera device applicable to ultra-slim, ultra-small, and high-resolution cameras. In particular, it is possible to efficiently arrange an actuator for OIS without increasing the overall size of the camera device.

According to an embodiment of the present disclosure, the tilting in the X-axis direction and the tilting in the Y-axis direction do not cause magnetic field interference with each other, and also the tilting in the X-axis direction and the tilting in the Y-axis direction can be implemented with a stable structure and realize a precise OIS function without causing magnetic field interference with an actuator for AF or zooming.

According to an embodiment of the present disclosure, it is possible to secure a sufficient amount of light by solving a size limitation of a lens, and it is also possible to implement OIS with low power consumption.

Various and beneficial advantages and effects of the present disclosure are not limited to the above and will be more easily understood in the description of specific embodiments of the present disclosure.

BEST MODE

Figure 1:
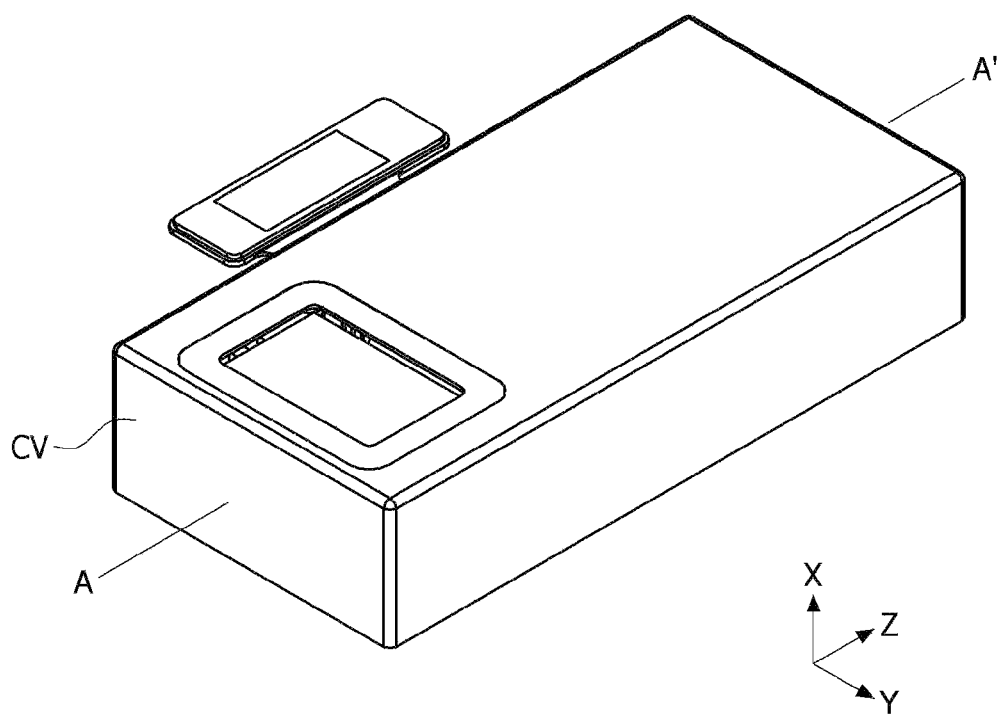
FIG. 1 is a perspective view of a camera device according to an embodiment.

The present disclosure may have various embodiments with several modifications, and specific embodiments will be described with reference to the accompanying drawings.

However, this is not intended to limit the present disclosure to specific embodiments, and it should be understood that all modifications, equivalents, and alternatives are included in the subject matter and scope of the present disclosure.

The terms including ordinal numbers such as first, second, etc. may be used to indicate various elements, but such elements are not limited by the terms. The terms are used only for the purpose of distinguishing one element from another. For example, without departing from the scope of the present disclosure, a second element may be referred to as a first element, and similarly, a first element may also be referred to as a second element. The term "and/or" includes any one of or any combination of a plurality of enumerated items.

When it is mentioned that a certain element is "coupled with/to" or "connected with/to" another element, it will be understood that the certain element is coupled or connected to another element directly or via any other element. On the other hand, when it is mentioned that a certain element is "directly coupled with/to" or "directly connected with/to" another element, it will be understood that there is no element interposed between both elements.

Terms used in the present disclosure are used only to describe certain embodiments and may not be intended to limit the scope of the present disclosure. The singular expressions may include plural expressions unless the context clearly dictates otherwise. In the disclosure, the terms such as "comprise", "include", and "have" denote the presence of stated elements, components, operations, functions, features, and the like, but do not exclude the presence of or a possibility of addition of one or more other elements, components, operations, functions, features, and the like.

Unless otherwise defined, all terms used herein, including technical or scientific terms, have the same meaning as commonly understood by one of ordinary skill in the art to which the present disclosure belongs. Among terms used herein, terms defined in a generic dictionary may be interpreted as having the same or similar meaning as the contextual meanings of the related art and, unless explicitly defined herein, may not be interpreted as ideally or excessively formal sense.

Hereinafter, embodiments will be described in detail with reference to the accompanying drawings. The same or corresponding elements are given the same reference numerals, and overlapping descriptions thereof will be omitted.

Figure 2:
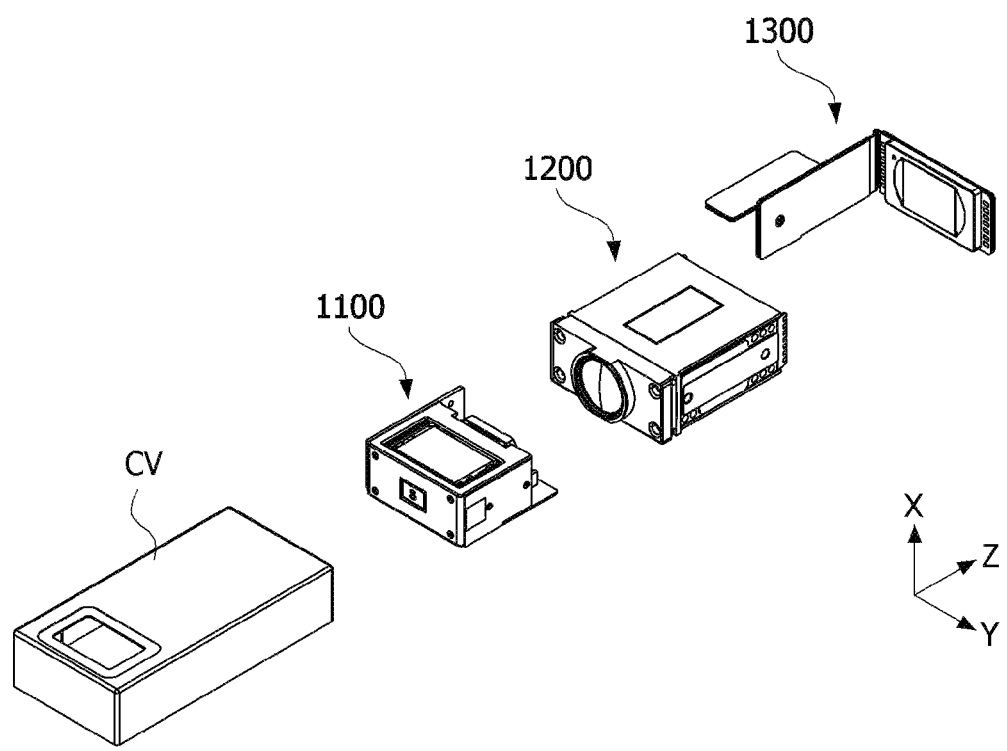
FIG. 2 is an exploded perspective view of a camera device according to an embodiment.
Figure 3:
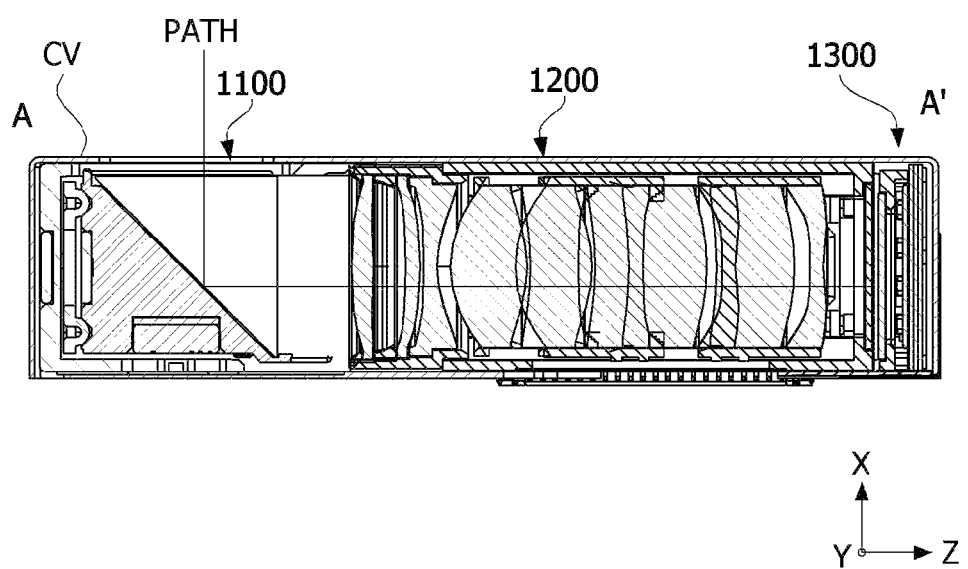
FIG. 3 is a cross-sectional view taken along line AA' in FIG. 1.

FIG. 1 is a perspective view of a camera device according to an embodiment, FIG. 2 is an exploded perspective view of a camera device according to an embodiment, and FIG. 3 is a cross-sectional view taken along line AA' in FIG. 1.

Referring to FIGS. 1 and 2, a camera device 1000 according to an embodiment may include a cover CV, a first camera actuator 1100, a second camera actuator 1200, and a circuit board 1300. Here, the first camera actuator 1100 may be interchangeably referred to as a first actuator, and the second camera actuator 1200 may be interchangeably referred to as a second actuator.

The cover CV may cover the first camera actuator 1100 and the second camera actuator 1200. A combining force between the first camera actuator 1100 and the second camera actuator 1200 may be improved by the cover CV.

Furthermore, the cover CV may be made of a material that blocks electromagnetic waves. Accordingly, the first camera actuator 1100 and the second camera actuator 1200 in the cover CV can be easily protected.

The first camera actuator 1100 may be an optical image stabilizer (OIS) actuator.

The first camera actuator 1100 may include a fixed focal length lens disposed in a predetermined barrel (not shown). The fixed focal length lens may also be referred to as a "single focal length lens" or "single lens".

The first camera actuator 1100 may change the path of light. In an embodiment, the first camera actuator 1100 may vertically change the light path through an optical member (e.g., a mirror) therein. With this configuration, even if the thickness of a mobile terminal is reduced, a lens configuration larger than the mobile terminal thickness can be disposed in the mobile terminal through a change in the optical path, and zooming, auto-focusing (AF), and OIS functions can be performed.

The second camera actuator 1200 may be disposed at the rear end of the first camera actuator 1100. The second camera actuator 1200 may be combined with the first camera actuator 1100. This combining may be made by various manners.

In addition, the second camera actuator 1200 may be a zoom actuator or an auto focus (AF) actuator. For example, the second camera actuator 1200 may support one lens or a plurality of lenses and may perform an auto-focusing function or a zoom function by moving the lenses in response to a control signal of a predetermined controller.

The circuit board 1300 may be disposed at the rear end of the second camera actuator 1200. The circuit board 1300 may be electrically connected to the second camera actuator 1200 and the first camera actuator 1100. Also, there may be a plurality of circuit boards 1300.

The circuit board 1300 may be connected to a second housing of the second camera actuator 1200, and an image sensor may be provided. Furthermore, on the circuit board 1300, a base unit including a filter may be provided. This will be described later.

The camera device according to an embodiment may be composed of a single camera device or a plurality of camera devices. For example, the plurality of camera devices may include a first camera device and a second camera device.

The first camera device may include a single actuator or a plurality of actuators. For example, the first camera device may include the first camera actuator 1100 and the second camera actuator 1200.

The second camera device may include an actuator (not shown) disposed in a predetermined housing (not shown) and capable of driving the lens. The actuator may be a voice coil motor, a micro actuator, a silicon actuator, etc., and may be applied in various ways such as, but not limited to, an electrostatic type, a thermal type, a bimorph type, an electrostatic force type, and the like. Also, in this specification, the camera actuator may be referred to as an actuator or the like. In addition, the camera device including a plurality of camera devices may be mounted in various electronic devices such as a mobile terminal.

Referring to FIG. 3, the camera device according to an embodiment may include the first camera actuator 1100 performing an OIS function, and the second camera actuator 1200 performing a zooming function and an auto-focusing (AF) function.

The light may be incident into the camera device through an opening area located in an upper surface of the first camera actuator 1100. That is, the light may be incident into the inside of the first camera actuator 1100 along the optical axis direction (e.g., the X-axis direction), and the optical path may be changed to the vertical direction (e.g., the Z-axis direction) through an optical member. In addition, the light may pass through the second camera actuator 1200 and be incident to an image sensor IS located at one end of the second camera actuator 1200 (PATH).

In this specification, a lower surface refers to one side in a first direction. In addition, the first direction is the X-axis direction in the drawing and may be used interchangeably with a second axis direction. A second direction is the Y-axis direction in the drawing and may be used interchangeably with a first axis direction. The second direction is perpendicular to the first direction. In addition, a third direction is the Z-axis direction in the drawing and may be used interchangeably with a third axis direction. The third direction is perpendicular to both the first direction and the second direction. The third direction (Z-axis direction) corresponds to the direction of the optical axis, and the first direction (X-axis direction) and the second direction (Y-axis direction) are perpendicular to the optical axis and can be tilted by the second camera actuator. A detailed description thereof will be given later.

In the following description of the first camera actuator 1100 and the second camera actuator 1200, the optical axis direction corresponds to the optical path and is the third direction (Z-axis direction), which will be used as a basis of the following description.

With this configuration, the camera device according to an embodiment can improve the spatial limitation of the first and second camera actuators by changing the light path. That is, in response to a change of the light path, the camera device according to an embodiment can extend the light path while minimizing the thickness of the camera device. Furthermore, the second camera actuator can provide a high range of magnification by controlling a focus or the like on the extended optical path.

In addition, the camera device according to an embodiment may implement the OIS through control of the optical path by the first camera actuator, thereby minimizing the occurrence of a decent or tilt phenomenon, and exhibiting the best optical properties.

Furthermore, the second camera actuator 1200 may include an optical system and a lens driving unit. For example, in the second camera actuator 1200, at least one of a first lens assembly, a second lens assembly, a third lens assembly, and a guide pin may be disposed.

Also, the second camera actuator 1200 may include a coil and a magnet to perform a high-magnification zooming function.

For example, the first lens assembly and the second lens assembly may be a moving lens that moves through the coil, the magnet, and the guide pin, and the third lens assembly may be a fixed lens, but this is not a limitation. For example, the third lens assembly may perform the function of a concentrator (focator) that images light at a specific position, and the first lens assembly may perform the function of a variator that re-images the image formed by the third lens assembly to another position. Meanwhile, a magnification change may be large in the first lens assembly because a distance to a subject or an image distance changes a lot, and the first lens assembly which is a variator may perform an important role in changing the focal length or magnification of the optical system. On the other hand, an image point formed by the first lens assembly which is a variator may be slightly different depending on a position. Therefore, the second lens assembly may perform a position compensation function for the image formed by the variator. For example, the second lens assembly may perform the function of a compensator that accurately forms, at an actual image sensor position, the image point formed by the first lens assembly which is a variator. For example, the first lens assembly and the second lens assembly may be driven with electromagnetic force by an interaction between the coil and the magnet. The above description may be applied to a lens assembly to be described later.

Meanwhile, when the actuator for OIS and the actuator for AF or zoom are disposed according to an embodiment of the present disclosure, magnetic field interference with the magnet for AF or zoom can be inhibited during the OIS operation. Because a first driving magnet of the first camera actuator 1100 is disposed separately from the second camera actuator 1200, magnetic field interference between the first camera actuator 1100 and the second camera actuator 1200 can be inhibited. In this specification, the OIS may be used interchangeably with terms such as hand-shake correction, optical image stabilization, optical image correction, and shake correction.

Figure 4:
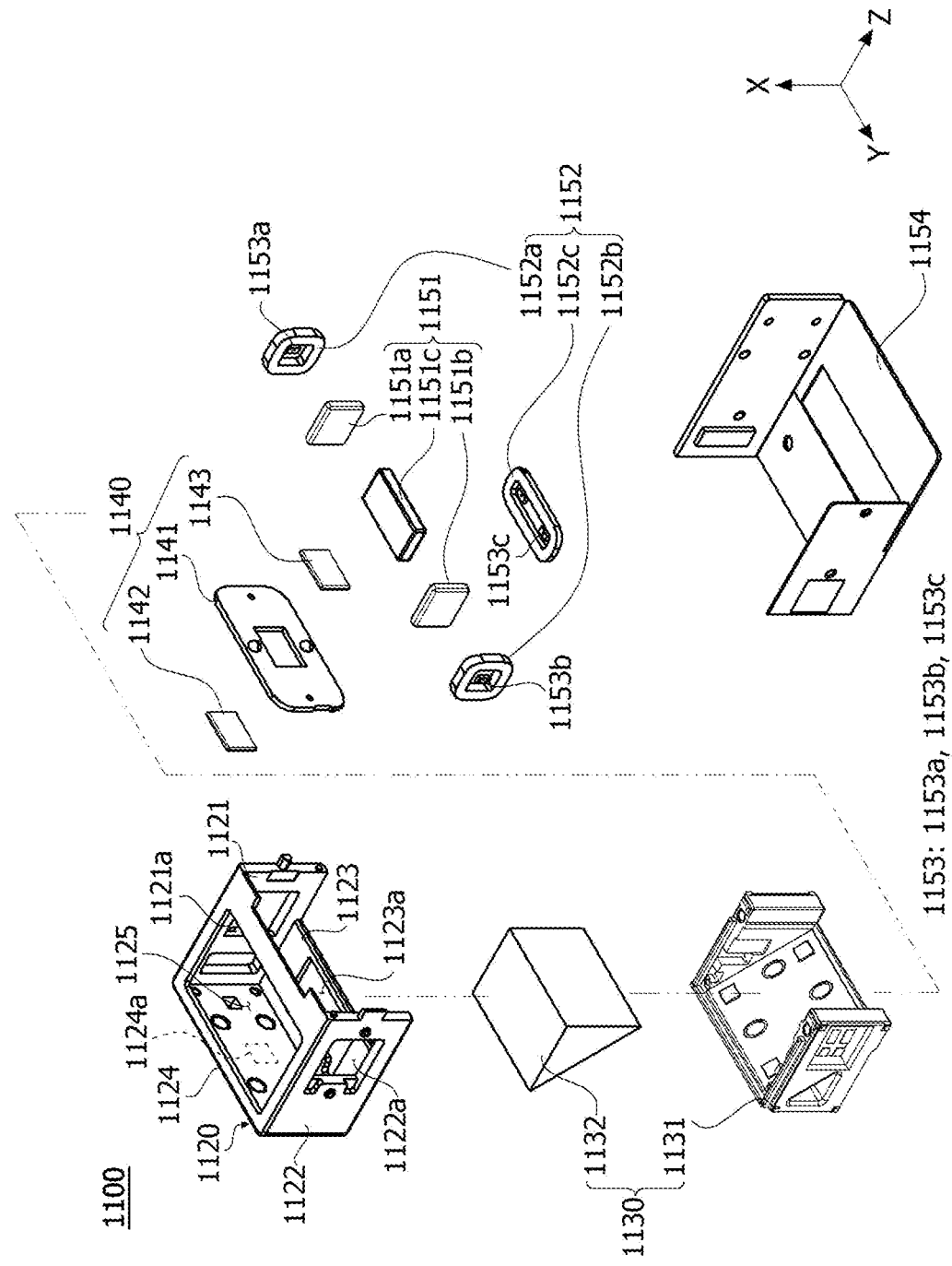
FIG. 4 is an exploded perspective view of a first camera actuator according to an embodiment.

FIG. 4 is an exploded perspective view of a first camera actuator according to an embodiment.

Referring to FIG. 4, the first camera actuator 1100 according to an embodiment includes a first shield can (not shown), a first housing 1120, a mover 1130, a rotation unit 1140, and a first driving unit 1150.

The mover 1130 may include a holder 1131 and an optical member 1132 disposed in the holder 1131. The rotation unit 1140 includes a rotation plate 1141, a first magnetic body 1142 having a bonding force with the rotation plate 1141, and a second magnetic body 1143 positioned in the rotation plate 1141. The first driving unit 1150 includes a first driving magnet 1151, a first driving coil 1152, a Hall sensor unit 1153, and a first substrate unit 1154.

The first shield can (not shown) may be positioned on the outermost of the first camera actuator 1100 to surround the rotation unit 1140 and the first driving unit 1150, which will be described later.

The first shield can (not shown) can block or reduce electromagnetic waves generated from the outside. Therefore, the occurrence of a malfunction in the rotation unit 1140 or the first driving unit 1150 may be reduced.

The first housing 1120 may be located inside the first shield can (not shown). In addition, the first housing 1120 may be located inside the first substrate unit 1154 to be described later. The first housing 1120 may be fitted into or fastened to the first shield can (not shown).

The first housing 1120 may be formed of a plurality of housing sides, which may include a first housing side 1121, a second housing side 1122, a third housing side 1123, and a fourth housing side 1124.

The first housing side 1121 and the second housing side 1122 may be disposed to face each other. Also, the third housing side 1123 and the fourth housing side 1124 may be disposed between the first housing side 1121 and the second housing side 1122.

The third housing side 1123 may be in contact with the first housing side 1121, the second housing side 1122, and the fourth housing side 1124. The third housing side 1123 may have a lower surface of the first housing 1120.

The first housing side 1121 may have a first housing hole 1121a. A first coil 1152a to be described later may be positioned in the first housing hole 1121a.

The second housing side 1122 may have a second housing hole 1122a. A second coil 1152b to be described later may be positioned in the second housing hole 1122a.

The first coil 1152a and the second coil 1152b may be combined with the first substrate unit 1154. In an embodiment, the first coil 1152a and the second coil 1152b may be electrically connected to the first substrate unit 1154 so that current may flow. This current is a component of electromagnetic force that allows the first camera actuator to tilt with respect to the X-axis.

The third housing side 1123 may have a third housing hole 1123a. A third coil 1152c to be described later may be positioned in the third housing hole 1123a. The third coil 1152c may be combined with the first substrate unit 1154. In addition, the third coil 1152c may be electrically connected to the first substrate unit 1154 so that current may flow. This current is a component of the electromagnetic force that allows the first camera actuator to tilt with respect to the Y-axis.

The fourth housing side 1124 may have a first housing recess 1124a. A first magnetic body 1142 to be described later may be disposed in a region corresponding to the first housing recess 1124a. Therefore, the first housing 1120 may be combined with the rotation plate 1141 by magnetic force or the like.

Depending on embodiments, the first housing recess 1124a may be located on the inner surface or the outer surface of the fourth housing side 1124. Therefore, the first magnetic body 1142 may be disposed to correspond to the position of the first housing recess 1124a.

In addition, the first housing 1120 may have a receiving space 1125 formed by the first to fourth housing sides 1121 to 1224. The mover 1130 may be positioned in the receiving space 1125.

The mover 1130 includes the holder 1131 and the optical member 1132 mounted on the holder 1131.

The holder 1131 may be placed in the receiving space 1125 of the first housing 1120. The holder 1131 may include first to fourth prism outer surfaces corresponding to the first housing side 1121, the second housing side 1122, the third housing side 1123, and the fourth housing side 1124, respectively.

A recess in which the second magnetic body 1143 can be placed may be formed on the fourth prism outer surface facing the fourth housing side 1124.

The optical member 1132 may be mounted on the holder 1131. To this end, the holder 1131 may have a mounting surface, which may be formed by a receiving recess. The optical member 1132 may include a reflector disposed therein. However, this is not a limitation. The optical member 1132 may reflect light reflected from the outside (e.g., an object) into the camera device. In other words, the optical member 1132 may change a path of reflected light, thereby improving a spatial limitation of the first and second camera actuators. Accordingly, the camera device may provide a high range of magnifications by extending the optical path while minimizing thickness.

The rotation unit 1140 includes the rotation plate 1141, the first magnetic body 1142 having a bonding force with the rotation plate 1141, and the second magnetic body 1143 positioned in the rotation plate 1141.

The rotation plate 1141 may be combined with the mover 1130 and the first housing 1120, which are described above. The rotation plate 1141 may include an additional magnetic material (not shown) positioned therein.

The rotation plate 1141 may be disposed adjacent to the optical axis. Accordingly, the actuator according to an embodiment can easily change the optical path depending on first and second axis tilts to be described later.

The rotation plate 1141 may include first protrusions disposed to be spaced apart in the first direction (X-axis direction), and second protrusions disposed to be spaced apart in the second direction (Y-axis direction). The first protrusion and the second protrusion may protrude in opposite directions. A detailed description thereof will be given later.

The first magnetic body 1142 may include a plurality of yokes, and the plurality of yokes may be positioned to face each other with respect to the rotation plate 1141. In an embodiment, the first magnetic body 1142 may be formed of a plurality of yokes facing each other. Also, the rotation plate 1141 may be located between the plurality of yokes.

The first magnetic body 1142 may be located in the first housing 1120 as described above. Also, as described above, the first magnetic body 1142 may be placed on the inner or outer surface of the fourth housing side 1124. For example, the first magnetic body 1142 may be placed in a recess formed on the outer surface of the fourth housing side 1124. Alternatively, the first magnetic body 1142 may be placed in the above-described first housing recess 1124a.

The second magnetic body 1143 may be located on the outer surface of the mover 1130, particularly the holder 1131. With this configuration, the rotation plate 1141 can be easily combined with the first housing 1120 and the mover 1130 by a magnetic force between the second magnetic body 1143 and the first magnetic body 1142. In the present disclosure, the positions of the first magnetic body 1142 and the second magnetic body 1143 may be changed to each other.

The first driving unit 1150 includes the first driving magnet 1151, the first driving coil 1152, the Hall sensor unit 1153, and the first substrate unit 1154.

The first driving magnet 1151 may include a plurality of magnets. In an embodiment, the first driving magnet 1151 may include a first magnet 1151a, a second magnet 1151b, and a third magnet 1151c.

The first magnet 1151a, the second magnet 1151b, and the third magnet 1151c may be located on the outer surfaces of the holder 1131, respectively. In addition, the first magnet 1151a and the second magnet 1151b may be positioned to face each other. Also, the third magnet 1151c may be located on the lower surface among the outer surfaces of the holder 1131. A detailed description thereof will be given later.

The first driving coil 1152 may include a plurality of coils. In an embodiment, the first driving coil 1152 may include a first coil 1152a, a second coil 1152b, and a third coil 1152c.

The first coil 1152a may be positioned to face the first magnet 1151a. Therefore, the first coil 1152a may be located in the first housing hole 1121a of the first housing side 1121 as described above.

Also, the second coil 1152b may be positioned to face the second magnet 1151b. Therefore, the second coil 1152b may be located in the second housing hole 1122a of the second housing side 1122 as described above.

The first coil 1152a may be positioned to face the second coil 1152b. That is, the first coil 1152a and the second coil 1152b may be symmetrically positioned with respect to the first direction (X-axis direction). This may be equally applied to the first magnet 1151a and the second magnet 1151b. That is, the first magnet 1151a and the second magnet 1151b may be symmetrically positioned with respect to the first direction (X-axis direction). Also, the first coil 1152a, the second coil 1152b, the first magnet 1151a, and the second magnet 1151b may be disposed to overlap at least in part in the second direction (Y-axis direction). With this configuration, the X-axis tilting can be accurately performed without inclination to one side by the electromagnetic force between the first coil 1152a and the first magnet 1151a and the electromagnetic force between the second coil 1152b and the second magnet 1151b.

The third coil 1152c may be positioned to face the third magnet 1151c. Therefore, the third coil 1152c may be positioned in the third housing hole 1123a of the third housing side 1123 as described above. The third coil 1152c may perform the Y-axis tilting of the mover 1130 and the rotation unit 1140 with respect to the first housing 1120 by generating the electromagnetic force with the third magnet 1151c.

Here, the X-axis tilting refers to tilting based on the X-axis, and the Y-axis tilting refers to tilting based on the Y-axis.

The Hall sensor unit 1153 may include a plurality of Hall sensors. The Hall sensor corresponds to and is used interchangeably with a 'sensor unit' to be described later. In an embodiment, the Hall sensor unit 1153 may include a first Hall sensor 1153a, a second Hall sensor 1153b, and a third Hall sensor 1153c.

The first Hall sensor 1153a may be located inside the first coil 1152a. In addition, the second Hall sensor 1153b may be symmetrically disposed with the first Hall sensor 1153a with respect to the first direction (X-axis direction) and the third direction (Z-axis direction). Also, the second Hall sensor 1153b may be located inside the second coil 1152b.

The first Hall sensor 1153a may detect a change in magnetic flux inside the first coil 1153a. In addition, the second Hall sensor 1153b may detect a change in magnetic flux in the second coil 1152b. Therefore, position sensing between the first and second magnets 1151a and 1151b and the first and second Hall sensors 1153a and 1153b may be performed. For example, through the first and second Hall sensors 1153a and 1153b, the first camera actuator according to an embodiment may control the X-axis tilting.

The third Hall sensor 1153c may be located inside the third coil 1152c. The third Hall sensor 1153c may detect a change in magnetic flux inside the third coil 1152c. Therefore, position sensing between the third magnet 1151c and the third Hall sensor 1153c may be performed. Through this, the first camera actuator according to an embodiment may control the Y-axis tilting.

The first substrate unit 1154 may be located at a lower part of the first driving unit 1150. The first substrate unit 1154 may be electrically connected to the first driving coil 1152 and the Hall sensor unit 1153. For example, the first substrate unit 1154 may be bonded with the first driving coil 1152 and the Hall sensor unit 1153 by SMT. However, this is not a limitation.

The first substrate unit 1154 may be positioned between and combined with the first shield can (not shown) and the first housing 1120. Various combining manners may be made as described above. In addition, through such combining, the first driving coil 1152 and the Hall sensor unit 1153 may be located on the outer surface of the first housing 1120.

The first substrate unit 1154 may include a circuit board having a wiring pattern for electrical connection, such as a rigid printed circuit board (Rigid PCB), a flexible printed circuit board (Flexible PCB), or a rigid printed circuit board (RigidFlexible PCB). However, these types are not construed as a limitation.

A detailed description about a relation between the Hall sensor unit 1153 and the first substrate unit 1154 will be given later.

Figure 5:
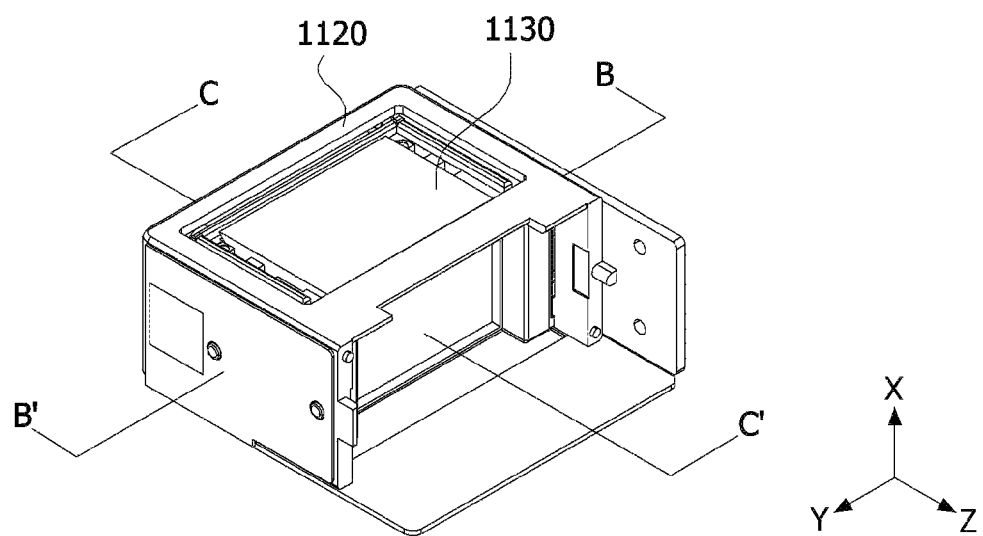
FIG. 5 is a perspective view of a first camera actuator in which a shield can and a substrate are removed, according to an embodiment.
Figure 6:
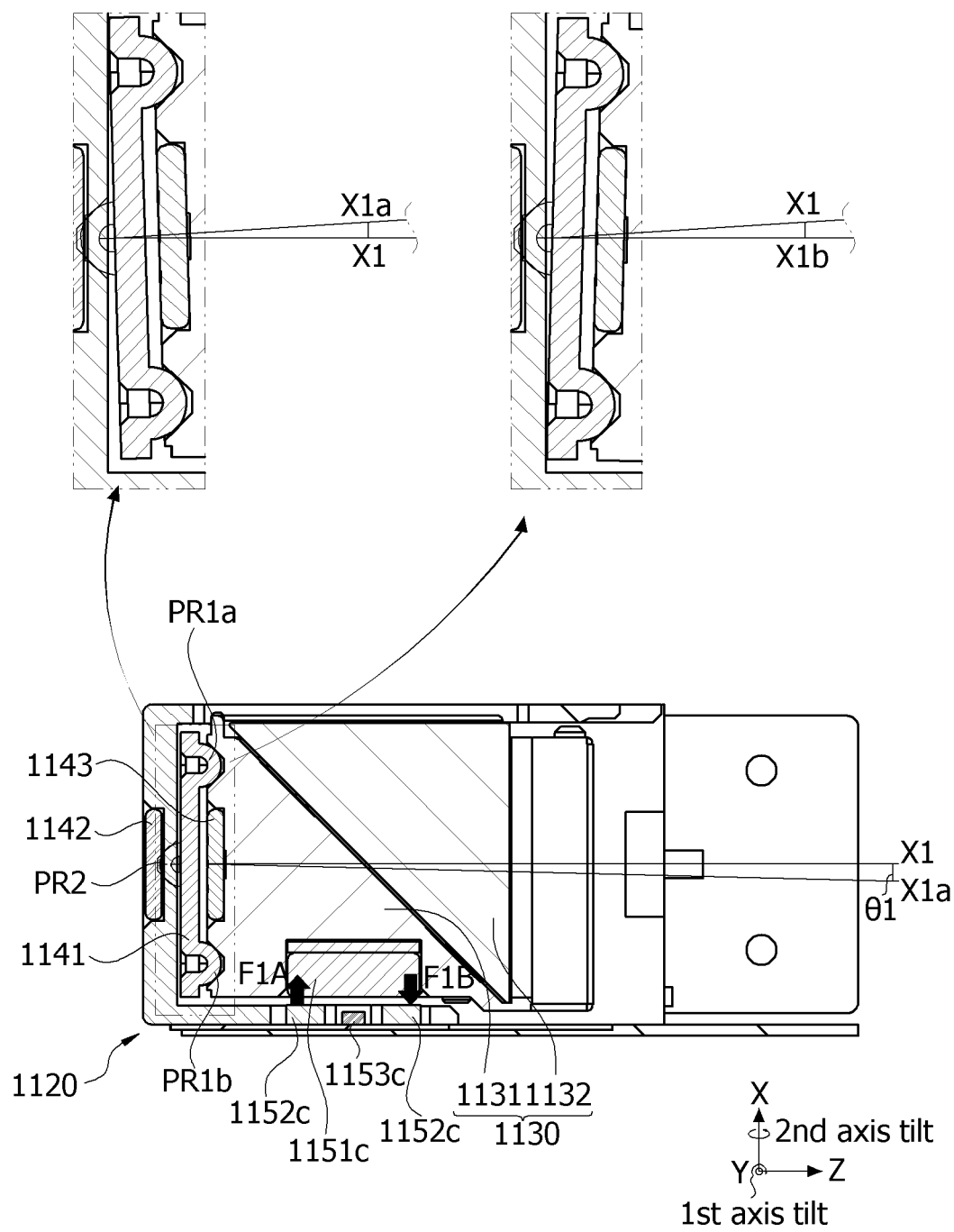
FIG. 6 is a cross-sectional view taken along line BB' in FIG. 5.
Figure 7:
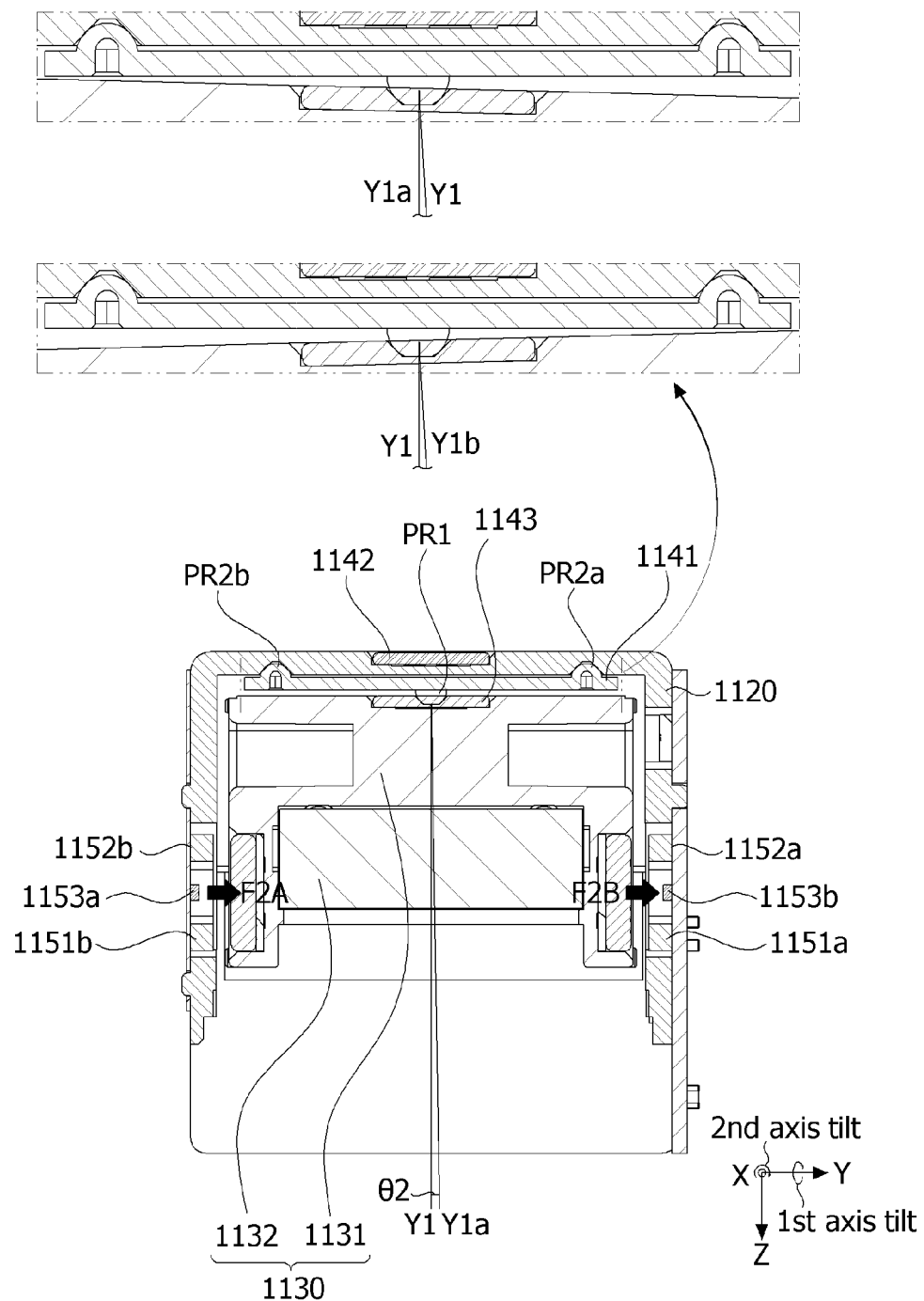
FIG. 7 is a cross-sectional view taken along line CC' in FIG. 5.

FIG. 5 is a perspective view of a first camera actuator in which a shield can and a substrate are removed, according to an embodiment, FIG. 6 is a cross-sectional view taken along line BB' in FIG. 5, and FIG. 7 is a cross-sectional view taken along line CC' in FIG. 5.

Referring to FIGS. 5 to 7, the first coil 1152a may be positioned on the first housing side 1121.

The first coil 1152a and the first magnet 1151a may be positioned to face each other. The first magnet 1151a may overlap with the first coil 1152a at least in part in the second direction (Y-axis direction).

Also, the second coil 1152b may be positioned on the second housing side 1122. Therefore, the second coil 1152b and the second magnet 1151b may be positioned to face each other. The second magnet 1151b may overlap with the second coil 1152b at least in part in the second direction (Y-axis direction).

In addition, the first coil 1152a and the second coil 1152b may overlap in the second direction (Y-axis direction), and the first magnet 1151a and the second magnet 1151b may overlap in the second direction (Y-axis direction). With this configuration, the electromagnetic force applied to the outer surface of the holder (a first holder outer surface and a second holder outer surface) is located on the parallel axis in the second direction (Y-axis direction), so that the X-axis tilting can be performed accurately and precisely.

In addition, a first receiving groove (not shown) may be formed on a fourth holder outer surface. Also, the first protrusions PR1a and PR1b may be disposed in the first receiving groove. Therefore, in the case of performing the X-axis tilting, the first protrusions PR1a and PR1b may be a reference axis (or rotation axis) of the tilt. Accordingly, the rotation plate 1141 and the mover 1130 can move left and right.

The second protrusion PR2 may be placed in a groove of the inner surface of the fourth housing side 1124 as described above. Also, in the case of performing the Y-axis tilting, the rotation plate and the mover can rotate with the second protrusion PR2 as a reference axis of the Y-axis tilting.

According to an embodiment, the OIS may be performed by the first and second protrusions.

Referring to FIG. 6, the Y-axis tilting can be performed. That is, the OIS may be implemented through rotation in the first direction (X-axis direction).

In an embodiment, the third magnet 1151c disposed under the holder 1131 can tilt or rotate the mover 1130 in the first direction (X-axis direction) by forming the electromagnetic force with the third coil 1152c.

Specifically, the rotation plate 1141 may be combined with the first housing 1120 and the mover 1130 by the first magnetic body 1142 in the first housing 1120 and the second magnetic body 1143 in the mover 1130. Also, the first protrusions PR1 may be spaced apart from each other in the first direction (X-axis direction) and supported by the first housing 1120.

In addition, the rotation plate 1141 may be rotated or tilted with the second protrusion PR2, protruding toward the mover 1130, as a reference axis (or rotation axis). That is, the rotation plate 1141 may perform the Y-axis tilting with respect to the second protrusion PR2 as a reference axis.

For example, the OIS may be implemented while the first electromagnetic force F1A and F1B between the third magnet 1151c disposed in a third recess and the third coil 1152c disposed on a third substrate side rotates (X1→X1a or X1b) the mover 1130 at a first angle $\theta 1$ in the X-axis direction. The first angle $\theta 1$ may be $\pm 1°$ to $\pm 3°$. However, this is not a limitation.

Referring to FIG. 7, the X-axis tilting can be performed. That is, the OIS may be implemented through rotation in the second direction (Y-axis direction).

The OIS may be implemented while the mover 1130 is tilting or rotating (or the X-axis tilting) in the Y-axis direction.

In an embodiment, the first second magnets 1151*a* and 1151*b* disposed in the holder 1131 form the electromagnetic force with the first and second coils 1152*a* and 1152*b*, respectively, thereby tilting or rotating the rotation plate 1141 and the mover 1130 in the second direction (Y-axis direction).

The rotation plate 1141 may be rotated or tilted (or the X-axis tilting) in the second direction with the first protrusion PR1 as a reference axis (or rotation axis).

For example, the OIS may be implemented while the second electromagnetic force F2A and F2B between the first and second magnets 1151*a* and 1151*b* disposed in a first recess and the first and second coils 1152*a* and 1152*b* disposed on first and second substrate sides rotates (Y1→Y1*a* or Y1*b*) the mover 1130 at a second angle θ2 in the Y-axis direction. The second angle θ2 may be ±1° to ±3°. However, this is not a limitation.

As described above, the first actuator according to an embodiment can control the rotation of the rotation plate 1141 and the mover 1130 in the first direction (X-axis direction) or the second direction (Y-axis direction) by the electromagnetic force between the first driving magnet in the holder and the first driving coil disposed in the housing, thereby minimizing the occurrence of a decent or tilt phenomenon in the OIS implementation and providing the best optical properties. In addition, as described above, the 'Y-axis tilting' corresponds to rotation or tilt in the first direction (X-axis direction), and the 'X-axis tilting' corresponds to rotation or tilt in the second direction (Y-axis direction).

Figure 8:
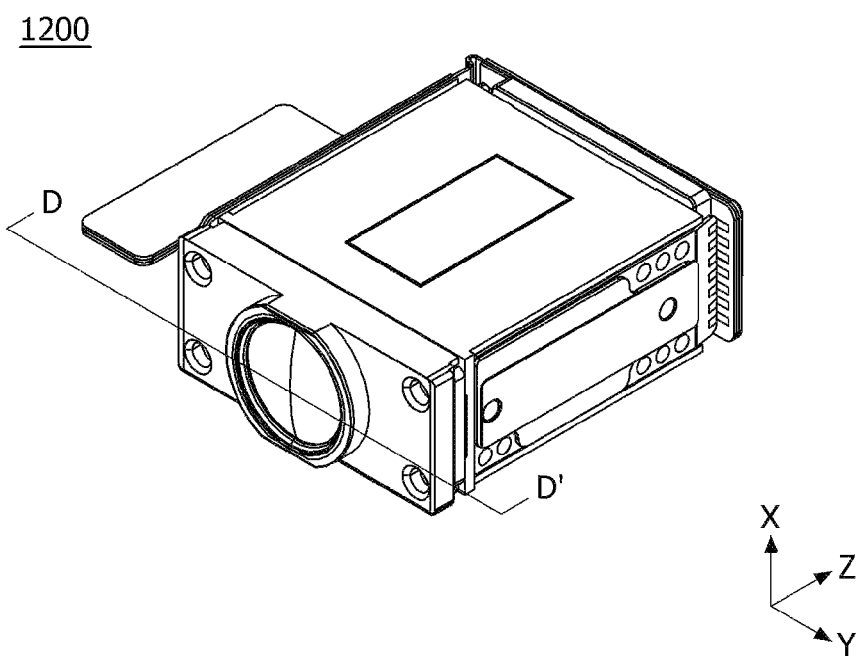
FIG. 8 is a perspective view of a second camera actuator according to an embodiment.
Figure 9:
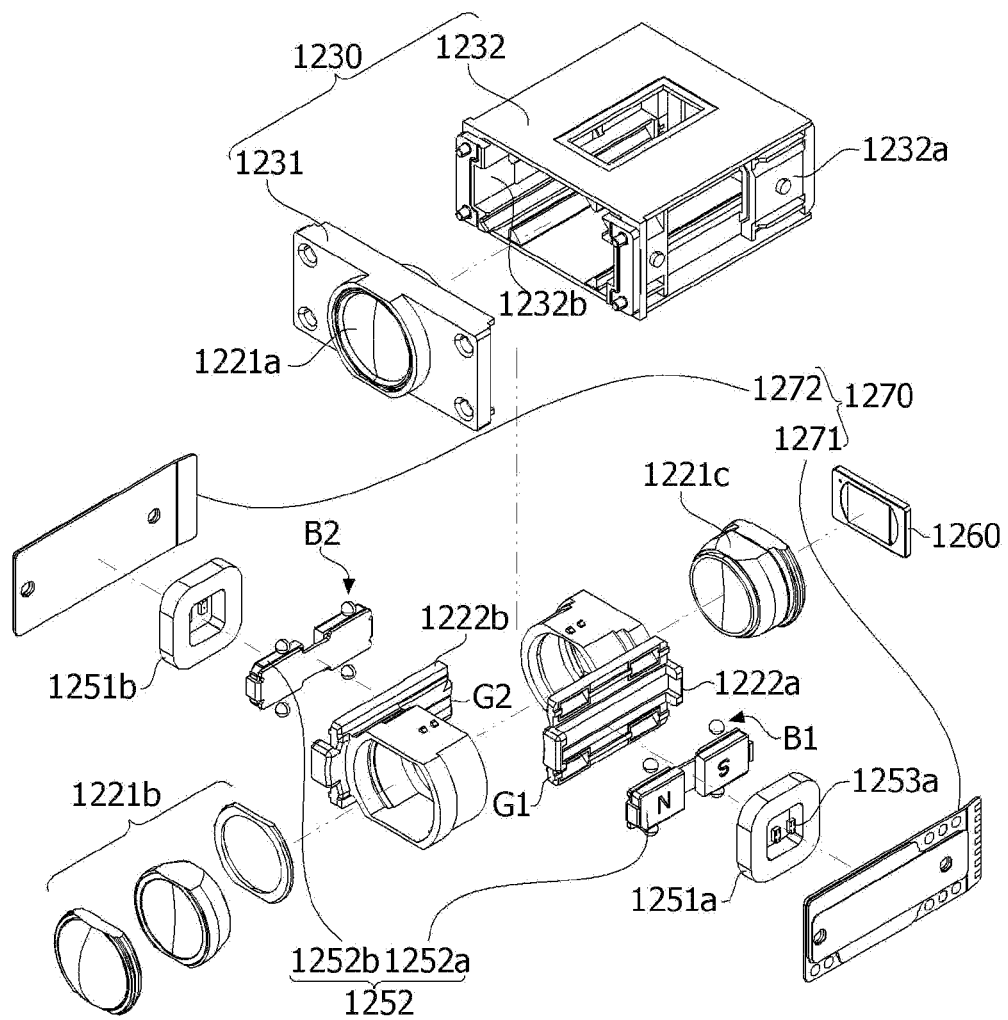
FIG. 9 is an exploded perspective view of a second camera actuator according to an embodiment.
Figure 10:
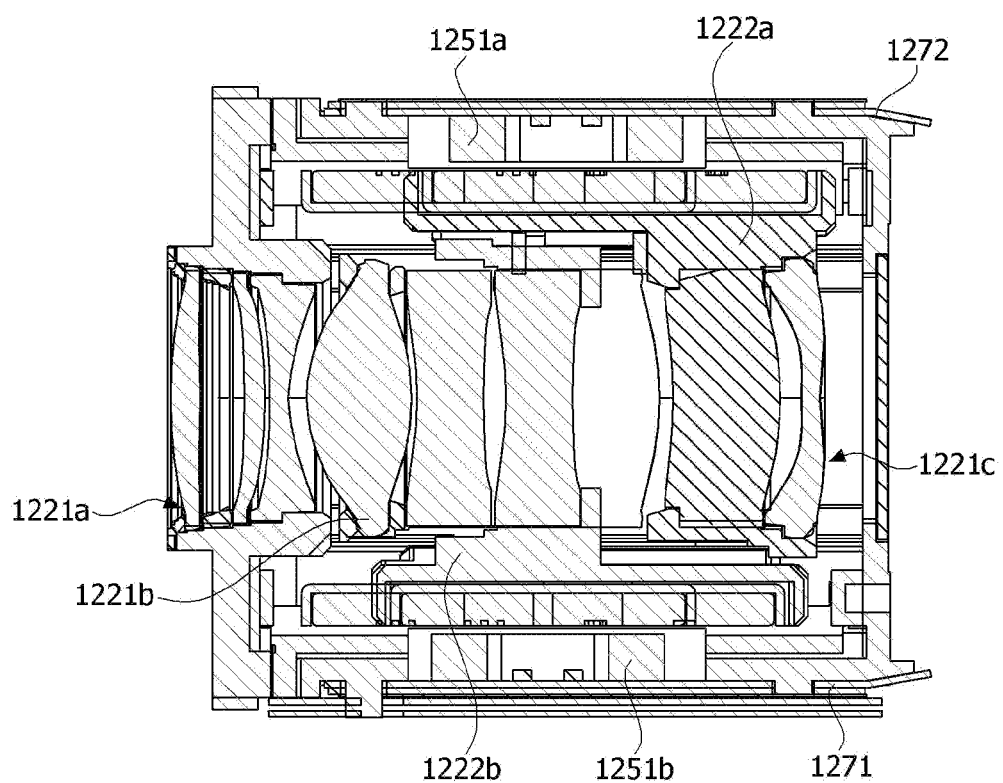
FIG. 10 is a cross-sectional view taken along line DD' in FIG. 8.
Figure 11:
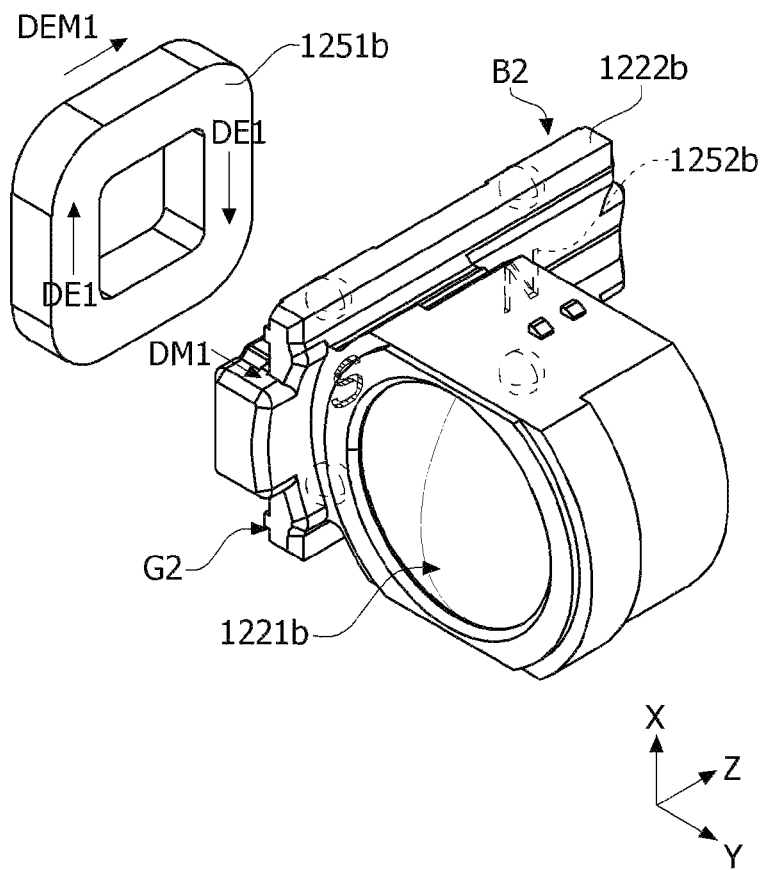
FIGS. 11 and 12 are views illustrating each driving of a lens assembly according to an embodiment.
Figure 12:
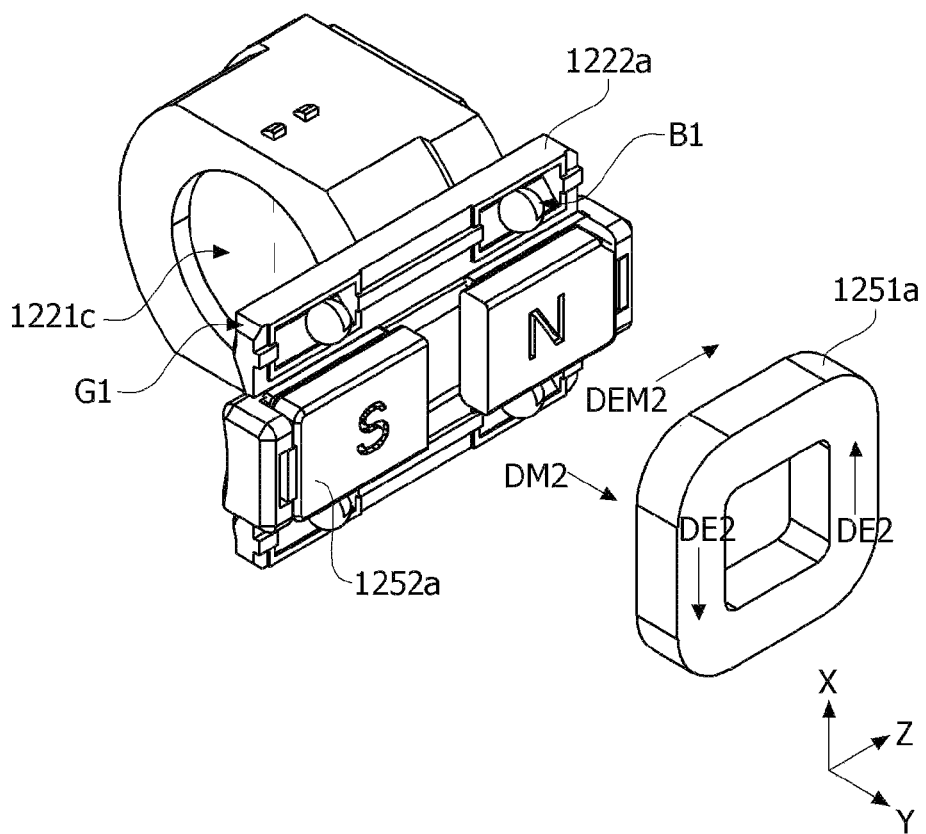
Figure 13:
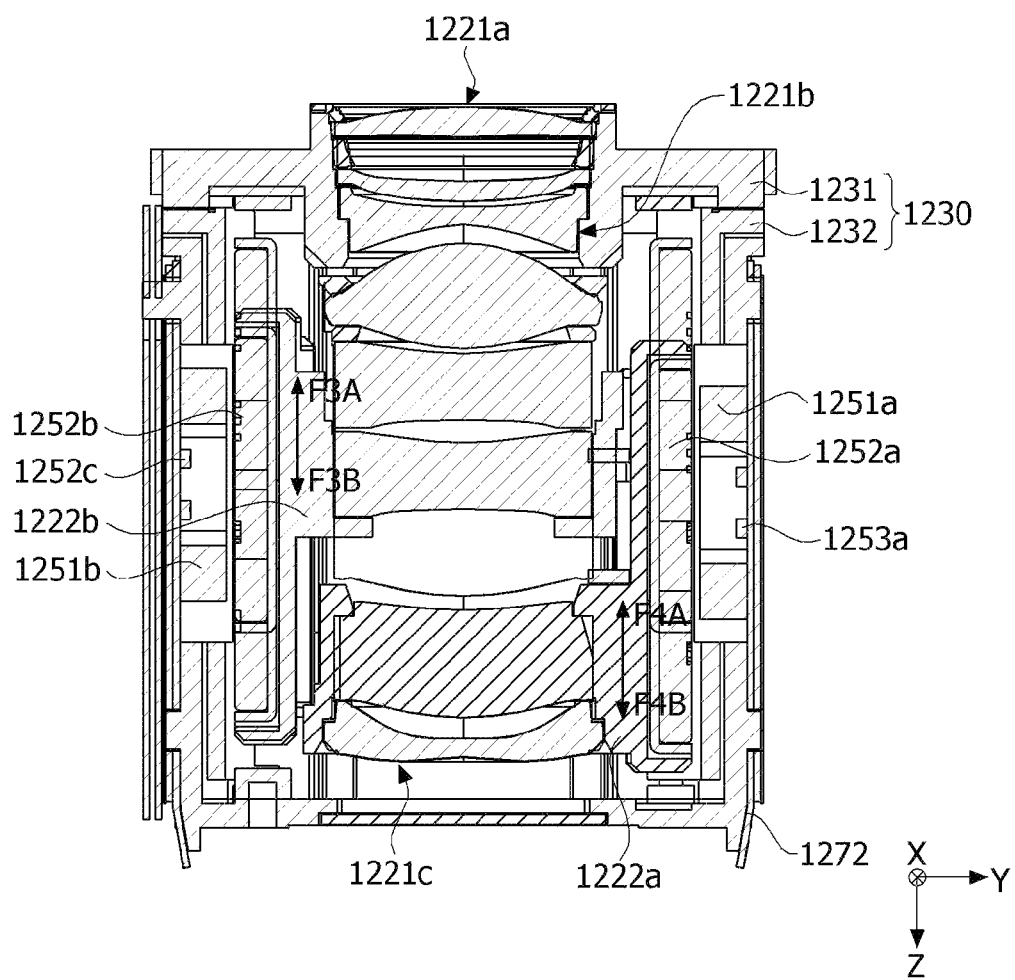
FIG. 13 is a view illustrating driving of a second camera actuator according to an embodiment.

FIG. 8 is a perspective view of a second camera actuator according to an embodiment, FIG. 9 is an exploded perspective view of a second camera actuator according to an embodiment, FIG. 10 is a cross-sectional view taken along line DD' in FIG. 8, FIGS. 11 and 12 are views illustrating each driving of a lens assembly according to an embodiment, and FIG. 13 is a view illustrating driving of a second camera actuator according to an embodiment.

Referring to FIGS. 8 to 10, a second camera actuator 1200 according to an embodiment may include a lens unit 1220, a second housing 1230, a second driving unit 1250, a base unit 1260, and a second substrate unit 1270. In addition, the second camera actuator 1200 may further include a second shield can (not shown), an elastic part (not shown), and a bonding member (not shown).

The second shield can (not shown) may be located in one region (e.g., the outermost) of the second camera actuator 1200 to surround components (the lens unit 1220, the second housing 1230, the second driving unit 1250, the base unit 1260, the second substrate unit 1270, and an image sensor IS) to be described later.

The second shield can (not shown) can block or reduce electromagnetic waves generated from the outside. Therefore, the occurrence of a malfunction in the second driving unit 1250 may be reduced.

The lens unit 1220 may be located in the second shield can (not shown). The lens unit 1220 may move in a third direction (Z-axis direction). Accordingly, the above-described AF function can be performed.

Also, the lens unit 1220 may be located in the second housing 1230. Thus, at least a portion of the lens unit 1220 may move along the optical axis direction or the third direction (Z axis direction) within the second housing 1230.

Specifically, the lens unit 1220 may include a lens group 1221 and a moving assembly 1222.

First, the lens group 1221 may include at least one lens. Also, there may be a plurality of lens groups 1221, but one of them will be described below.

The lens group 1221 is combined with the moving assembly 1222 and can move in the third direction (Z-axis direction) by the electromagnetic force generated from a fourth magnet 1252*a* and a fifth magnet 1252*b* combined with the moving assembly 1222.

In an embodiment, the lens group 1221 may include a first lens group 1221*a*, a second lens group 1221*b*, and a second lens group 1221*c*. The first lens group 1221*a*, the second lens group 1221*b*, and the second lens group 1221*c* may be sequentially disposed along the optical axis direction.

The first lens group 1221*a* may be fixedly combined with a second-first housing. In other words, the first lens group 1221*a* may not move along the optical axis direction.

The second lens group 1221*b* may be combined with a second lens assembly 1222*b* and move in the third direction or the optical axis direction. By the movement of the second lens group 1221*b*, magnification can be adjusted.

The third lens group 1221*c* may be combined with a first lens assembly 1222*a* and move in the third direction or the optical axis direction. By the movement of the third lens group 1221, focus can be adjusted.

However, the number of such lens groups is not limited, and a fourth lens group and the like may be further disposed at the rear of the third lens group 1221*c*. Furthermore, in the second camera actuator, the number of lens assemblies and lens groups may be variously changed.

The moving assembly 1222 may have an opening region surrounding the lens group 1221. The moving assembly 1222 is used interchangeably with the lens assembly. In addition, the moving assembly 1222 may be combined with the lens group 1221 by various methods. Also, the moving assembly 1222 may have a groove in lateral sides thereof and may be combined with the fourth magnet 1252*a* and the fifth magnet 1252*b* through the groove. A bonding member or the like may be applied on the groove.

In addition, the moving assembly 1222 may be combined with an elastic part (not shown) at upper and rear ends thereof. Therefore, the moving assembly 1222 may be supported by the elastic part (not shown) while moving in the third direction (Z-axis direction). That is, the position of the moving assembly 1222 may be maintained in the third direction (Z-axis direction). The elastic part (not shown) may be formed of a leaf spring.

The moving assembly 1222 is located in the second housing 1230 and may include a first lens assembly 1222*a* and a second lens assembly 1222*b*.

A region of the first lens assembly 1222*a* in which the third lens group is placed may be located at the rear end of the second lens assembly 1222*b*. That is, the region of the first lens assembly 1222*a* where the third lens group 1221*c* is placed may be located between a region of the second lens assembly 1222*b* where the second lens group 1221*b* is placed and the image sensor.

The first lens assembly 1222*a* and the second lens assembly 1222*b* may include a first guide part G1 and a second guide part G2, respectively.

The first guide part G1 of the first lens assembly 1222*a* and the second guide part G2 of the second lens assembly 1222*b* may be positioned to correspond to each other. For example, the first guide part G1 and the second guide part G2 may be positioned symmetrically with respect to the third direction.

The first guide part G1 and the second guide part G2 may include at least one groove or recess. In addition, a first ball B1 or a second ball B2 may be placed in the groove or recess. For example, the first ball B1 may be placed in the groove or recess of the first guide part G1. Also, the second ball B2 may be placed in the groove or recess of the second guide part G2. In addition, the first ball B1 or the second ball B2 may move in the third direction along a rail formed inside a first side 1232a of the second housing 1230 or a rail formed inside of a second side 1232b of the second housing 1230. Therefore, the first lens assembly 1222a and the second lens assembly 1222b can move in the third direction.

A second driving magnet may be placed on outer surfaces of the first and second lens assemblies 1222a and 1222b. For example, the fourth magnet 1252a may be placed on the outer surface of the first lens assembly 1222a. The fifth magnet 1252b may be placed on the outer surface of the second lens assembly 1222b.

The second housing 1230 may be disposed between the lens unit 1220 and the second shield can (not shown). In addition, the second housing 1230 may be disposed to surround the lens unit 1220.

The second housing 1230 may include a second-first housing 1231 and a second-second housing 1232. The second-first housing 1231 may be combined with the first lens group 1221a and may also be combined with the above-described first camera actuator. The second-first housing 1231 may be positioned at the front of the second-second housing 1232.

The second-second housing 1232 may be located at the rear of the second-first housing 1231. The lens unit 1220 may be placed inside the second-second housing 1232.

The second housing 1230 (or the second-second housing 1232) may have a hole formed in a side thereof. A fourth coil 1251a and a fifth coil 1251b may be disposed in the hole. The hole may be positioned to correspond to the groove of the moving assembly 1222 described above.

In an embodiment, the second housing 1230 may include a first side 1232a and a second side 1232b. The first side 1232a and the second side 1232b may be positioned to correspond to each other. For example, the first side 1232a and the second side 1232b may be symmetrically disposed with respect to the third direction. A second driving coil may be positioned on the first side 1232a and the second side 1232b. In addition, the second substrate unit 1270 may be placed on the outer surfaces of the first and second sides 1232a and 1232b. In other words, a first substrate 1271 may be positioned on the outer surface of the first side 1232a, and a second substrate 1272 may be positioned on the outer surface of the second side 1232b.

The fourth magnet 1252a may be positioned to face the fourth coil 1251a. Also, the fifth magnet 1252b may be positioned to face the fifth coil 1251b.

The elastic part (not shown) may include a first elastic member (not shown) and a second elastic member (not shown). The first elastic member (not shown) may be combined with the upper surface of the moving assembly 1222. The second elastic member (not shown) may be combined with the lower surface of the moving assembly 1222. Also, the first elastic member (not shown) and the second elastic member (not shown) may be formed of a leaf spring as mentioned above. In addition, the first elastic member (not shown) and the second elastic member (not shown) may provide elasticity with respect to the movement of the moving assembly 1222.

The second driving unit 1250 may provide a driving force for moving the lens unit 1220 in the third direction (Z-axis direction). The second driving unit 1250 may include a second driving coil 1251 and a second driving magnet 1252.

The lens unit 1220 may move in the third direction (Z-axis direction) by the electromagnetic force formed between the second driving coil 1251 and the second driving magnet 1252.

The second driving coil 1251 may include a fourth coil 1251a and a fifth coil 1251b. The fourth coil 1251a and the fifth coil 1251b may be disposed in holes formed in the sides of the second housing 1230. In addition, the fourth coil 1251a and the fifth coil 1251b may be electrically connected to the second substrate unit 1270. Therefore, the fourth coil 1251a and the fifth coil 1251b may receive current or the like through the second substrate unit 1270.

The second driving magnet 1252 may include a fourth magnet 1252a and a fifth magnet 1252b. The fourth magnet 1252a and the fifth magnet 1252b may be disposed in the aforementioned recess of the moving assembly 1222 and located to correspond to the fourth coil 1251a and the fifth coil 1251b.

The base unit 1260 may be positioned between the lens unit 1220 and the image sensor IS. A component such as a filter may be fixed to the base unit 1260. Also, the base unit 1260 may be disposed to surround the image sensor IS. With this configuration, the image sensor IS may be free from foreign substances, and thus the reliability of the device may be improved.

In addition, the second camera actuator 1200 may be a zoom actuator or an auto focus (AF) actuator. For example, the second camera actuator may support one or a plurality of lenses and may perform an autofocusing function or a zooming function by moving the lenses in response to a control signal of a predetermined controller.

Also, the second camera actuator may be a fixed zoom or a continuous zoom. For example, the second camera actuator may provide the movement of the lens group 1221.

In addition, the second camera actuator may be formed of a plurality of lens assemblies. For example, in the second camera actuator, at least one of a third lens assembly (not shown) and a guide pin (not shown) in addition to the first lens assembly 1222a and the second lens assembly 1222b may be disposed. In this regard, the above description may be applied. Therefore, the second camera actuator may perform a high-magnification zooming function through the driving unit. For example, the first lens assembly 1222a and the second lens assembly 1222b may be a moving lens that moves through the driving unit and the guide pin (not shown), and the third lens assembly (not shown) may be a fixed lens, but this is not a limitation. For example, the third lens assembly (not shown) may perform the function of a concentrator (focator) that images light at a specific position, and the first lens assembly may perform the function of a variator that re-images the image formed by the third lens assembly (not shown) to another position. Meanwhile, a magnification change may be large in the first lens assembly because a distance to a subject or an image distance changes a lot, and the first lens assembly which is a variator may perform an important role in changing the focal length or magnification of the optical system. On the other hand, an image point formed by the first lens assembly which is a variator may be slightly different depending on a position. Therefore, the second lens assembly may perform a position compensation function for the image formed by the variator. For example, the second lens assembly may perform the function of a compensator that accurately forms, at an actual image sensor position, the image point formed by the first lens assembly 1222a which is a variator. However, the configuration of the present embodiment will be described with reference to the following drawings.

The image sensor IS may be located inside or outside the second camera actuator. In an embodiment, as shown, the image sensor IS may be located inside the second camera actuator. The image sensor IS may receive light and convert the received light into an electrical signal. In addition, the image sensor IS may have a plurality of pixels in the form of an array. Also, the image sensor IS may be located on the optical axis.

The second substrate unit 1270 may be in contact with the side of the second housing. For example, the second substrate unit 1270 may be located on the outer surface (first side surface) of the first side and the outer surface (second side surface) of the second side of the second housing, especially the second-second housing, and may be in contact with the first side surface and the second side surface. A detailed description thereof will be given later.

Referring to FIGS. 11 and 12, in the camera device according to an embodiment, the fourth magnet 1252*a* may be provided on the first lens assembly 1222*a* in, for example, a vertical magnetization manner. For example, in an embodiment, both the N pole and the S pole of the fourth magnet 1252*a* may be positioned to face the fourth coil 1251*a*. Therefore, the N pole and the S pole of the fourth magnet 1252*a* may be respectively disposed to correspond to regions in which current flows in the X-axis direction or the opposite direction thereof in the fourth coil 1251*a*.

In an embodiment, when a magnetic force DM2 is applied from the N pole of the fourth magnet 1252*a* in the second direction (Y-axis direction) and a current DE2 flows in the first direction (X-axis direction) in the fourth coil 1251*a* corresponding to the N pole, an electromagnetic force DEM2 may act in the third direction (Z-axis direction) in accordance with the interaction of electromagnetic force (e.g., Fleming's left hand rule).

In addition, in an embodiment, when a magnetic force is applied from the S pole of the fourth magnet 1252*a* in the opposite direction to the second direction (Y-axis direction) and the current DE2 flows in the opposite direction to the first direction (X-axis direction) in the fourth coil 1251*a* corresponding to the S pole, the electromagnetic force DEM2 may act in the Z-axis direction in accordance with the interaction of electromagnetic force.

At this time, because the fourth coil 1251*a* is fixed to the side of the housing, the first lens assembly 1222*a* on which the fourth magnet 1252*a* is disposed can move along the rail located on the inner side of the housing through the first ball B1 in a direction (positive direction) parallel to the z-axis direction by the electromagnetic force DEM2 depending on the current direction. In this case, the electromagnetic force DEM2 may be controlled in proportion to the current DE2 applied to the fourth coil 1251*a*. Furthermore, the first lens assembly 1222*a* may move in a direction opposite to the third direction (Z-axis direction) by the aforementioned electromagnetic force DEM2. Also, when the aforementioned current flows in the opposite direction, the first lens assembly 1222*a* may move in the third direction (Z-axis direction).

Similarly, in the camera device according to an embodiment, an electromagnetic force DEM1 may be generated between the fifth magnet 1252*b* and the second coil 1251*b*, so that the second lens assembly 1222*b* can move along the rail located on the inner side of the housing through the second ball B2 in a direction perpendicular to the optical axis, that is, in the third direction (Z-axis direction) or the opposite direction thereof.

Specifically, in the camera device according to an embodiment, the fifth magnet 1252*b* may be provided on the second lens assembly 1222*b* in, for example, a vertical magnetization manner. For example, in an embodiment, both the N pole and the S pole of the fifth magnet 1252*b* may be positioned to face the fifth coil 1251*b*. Therefore, the N pole and the S pole of the fifth magnet 1252*b* may be respectively disposed to correspond to regions in which current flows in the X-axis direction or the opposite direction thereof in the fifth coil 1251*b*.

In the embodiment, when a magnetic force is applied from the N pole of the fifth magnet 1252*b* in the opposite direction to the second direction (Y-axis direction) and a current DE1 flows in the opposite direction to the first direction (X-axis direction) in the fifth coil 1251*b* corresponding to the N pole, an electromagnetic force DEM1 may act in the third direction (Z-axis direction) in accordance with the interaction of electromagnetic force (e.g., Fleming's left hand rule).

In addition, in an embodiment, when a magnetic force is applied from the S pole of the fifth magnet 1252*b* in the second direction (Y-axis direction) and the current DE1 flows in the first direction (X-axis direction) in the fifth coil 1251*b* corresponding to the S pole, the electromagnetic force DEM1 may act in the Z-axis direction in accordance with the interaction of electromagnetic force.

At this time, because the fifth coil 1251*b* is fixed to the side of the housing, the second lens assembly 1222*b* on which the fifth magnet 1252*b* is disposed can move along the rail located on the inner side of the housing through the second ball B2 in a direction (positive direction) parallel to the z-axis direction by the electromagnetic force DEM1 depending on the current direction. For example, the fifth magnet 1252*b* may move in a direction opposite to the third direction (Z-axis direction) by the aforementioned electromagnetic force DEM1. In this case, the electromagnetic force DEM1 may be controlled in proportion to the current DE1 applied to the fifth coil 1251*b*.

Referring to FIG. 13, in the camera device according to an embodiment, the second driving unit may provide driving forces F3A, F3B, F4A, and F4B for moving the first lens assembly 1222*a* and the second lens assembly 1222*b* of the lens unit 1220 in the third direction (Z-axis direction). The second driving unit may include the second driving coil 1251 and the second driving magnet 1252 as described above. In addition, the lens unit 1220 may move in the third direction (Z-axis direction) by the electromagnetic force formed between the second driving coil 1251 and the second driving magnet 1252.

In this case, the fourth coil 1251*a* and the fifth coil 1251*b* may be disposed in holes formed in the sides (e.g., the first side and the second side) of the second housing 1230. In addition, the fourth coil 1251*a* may be electrically connected to the first substrate 1271. The fifth coil 1251*b* may be electrically connected to the second substrate 1272. Therefore, the fourth coil 1251*a* and the fifth coil 1251*b* may receive a driving signal (e.g., current) from a driving driver on the main substrate of the circuit board 1300 through the second board unit 1270.

At this time, by the electromagnetic forces F4A and F4B between the fourth coil 1251*a* and the fourth magnet 1252*a*, the first lens assembly 1222*a* on which the fourth magnet 1252*a* is placed can move in the third direction (Z-axis direction). In addition, the third lens group 1221*c* placed on the first lens assembly 1222*a* can also move in the third direction.

Also, by the electromagnetic forces F3A and F3B between the fifth coil 1251*b* and the fifth magnet 1252*b*, the second lens assembly 1222b on which the fifth magnet 1252b is placed can move in the third direction (Z-axis direction). In addition, the second lens group 1221b placed on the second lens assembly 1222b can also move in the third direction.

Accordingly, the focal length or magnification of the optical system can be changed by the movement of the second and third lens groups 1221b and 1221c as described above. In an embodiment, the magnification may be changed by the movement of the second lens group 1221b. In other words, zooming may be performed. Also, the focus may be adjusted by the movement of the third lens group 1221c. In other words, auto focusing may be performed. With this configuration, the second camera actuator may be a fixed zoom or a continuous zoom.

Figure 14:
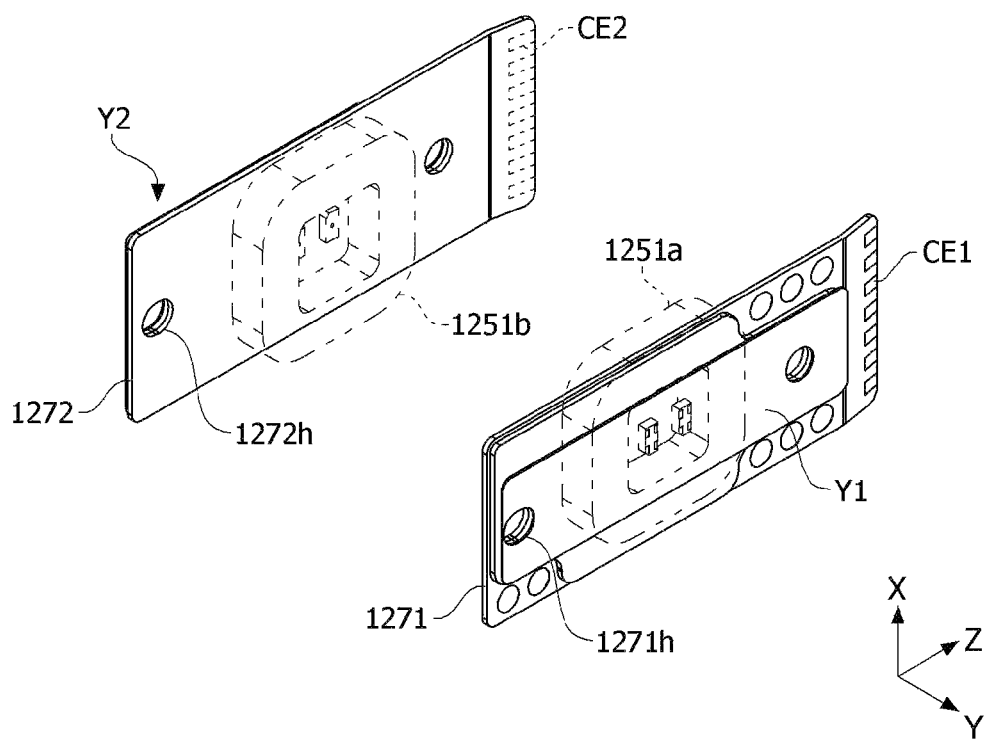
FIG. 14 is a perspective view showing a second substrate unit of a second camera actuator according to an embodiment.
Figure 15:
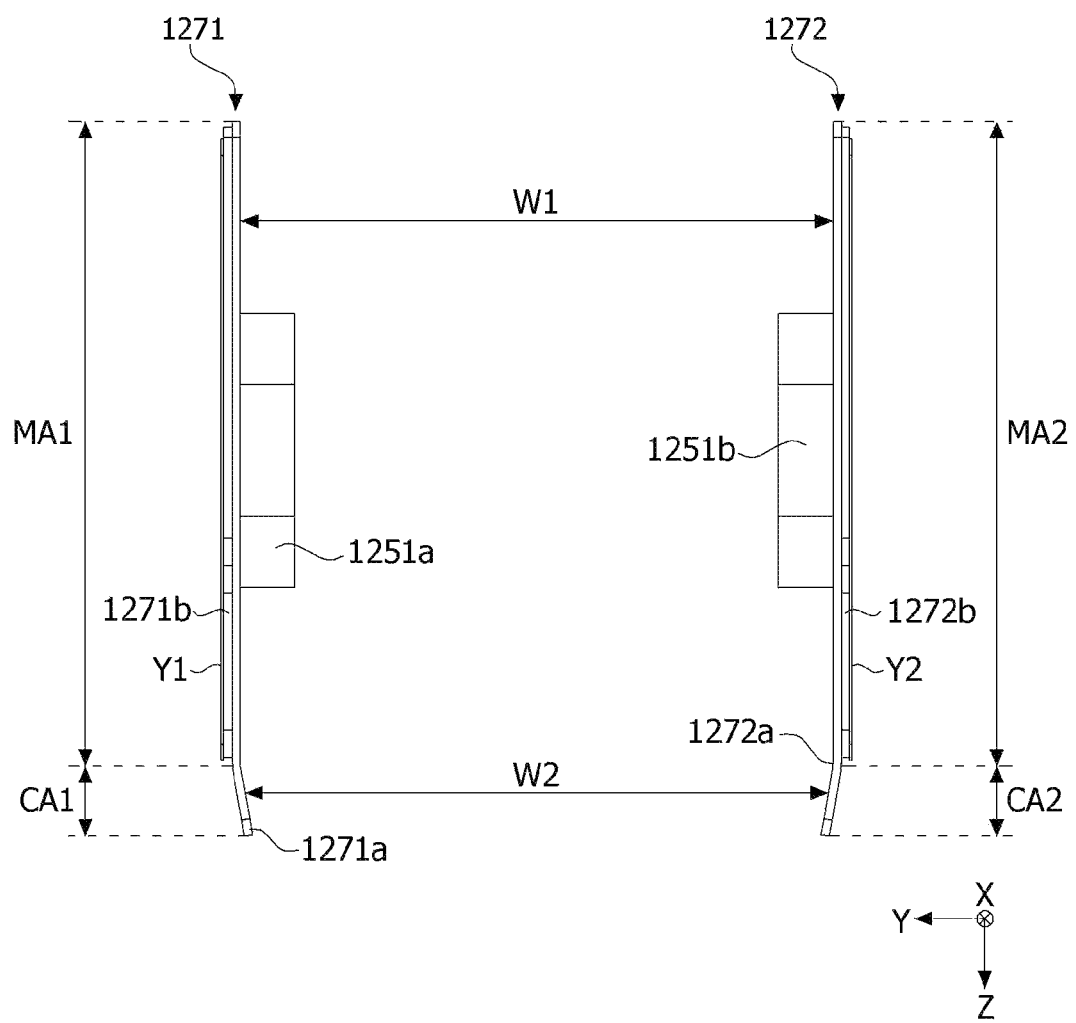
FIG. 15 is a side view showing a second substrate unit of a second camera actuator according to an embodiment.

FIG. 14 is a perspective view showing a second substrate unit of a second camera actuator according to an embodiment, and FIG. 15 is a side view showing a second substrate unit of a second camera actuator according to an embodiment.

Referring to FIGS. 14 and 15, as described above, the second substrate unit 1270 according to an embodiment may include the first substrate 1271 and the second substrate 1272.

The first substrate 1271 and the second substrate 1272 may be disposed on opposite side surfaces (e.g., the first side surface and the second side surface) of the second housing in the second housing. Thus, the first substrate 1271 and the second substrate 1272 may be spaced apart from each other.

In an embodiment, a connection member (e.g., a first connection member) may be positioned between the first substrate 1271 and the main substrate. Also, a connection member (e.g., a second connection member) may be positioned between the second substrate 1272 and the main substrate.

As described above, the fourth coil 1251a may be located on the first side surface of the second housing, and the fifth coil 1251b may be located on the second side surface of the second housing.

The first substrate 1271 may include a first main area MA1 and a first connection area CA1 that are partitioned along the third direction (Z-axis direction). The first connection area CA1 may be in contact with an end of the first main area MA1. For example, the first connection area CA1 may be positioned between the first main area MA1 and the main substrate. In addition, the first main area MA1 and the first connection area CA1 may be sequentially arranged side by side in the third direction (Z-axis direction).

In addition, the second substrate 1272 may include a second main area MA2 and a second connection area CA2 that are partitioned along the third direction (Z-axis direction). The second connection area CA2 may be in contact with an end of the second main area MA2. For example, the second connection area CA2 may be positioned between the second main area MA2 and the main substrate. In addition, the second main area MA2 and the second connection area CA2 may be sequentially arranged side by side in the third direction (Z-axis direction).

Also, the first connection area CA1 may be inclined inward with respect to the first main area MA1, and the second connection area CA2 may be inclined inward with respect to the second main area MA2. Here, inward may refer to a direction from the second housing toward the lens unit. Outward may refer to a direction opposite to inward.

In addition, a first separation distance W1 between the first main area MA1 and the second main area MA2 may be different from a second separation distance W2 between the first connection area CA1 and the second connection area CA2. In an embodiment, the first separation distance W1 between the first main area MA1 and the second main area MA2 may be greater than the second separation distance W2 between the first connection area CA1 and the second connection area CA2. With this configuration, the second substrate unit 1270 does not protrude outward compared to the main substrate or the circuit board, so that the overall width of the camera device can be minimized. Therefore, miniaturization of the camera device can be easily achieved. In this case, the first separation distance W1 and the second separation distance W2 may be lengths in the second direction (Y-axis direction).

Also, the first connection area CA1 may include a first connection terminal part CE1 disposed on the outer surface thereof. In addition, the second connection area CA2 may include a second connection terminal part CE2 disposed on the outer surface thereof.

The first connection terminal part CE1 and the second connection terminal part CE2 may be electrically connected to the first substrate terminal part and the second substrate terminal part, respectively, through connection members (e.g., the first connection member and the second connection member). The connection member may be made of a conductive material or include a conductive member. Through this, the driving driver on the main substrate may supply current, which is a driving signal, to the fourth coil 1251a and the fifth coil 1251b. In an embodiment, the driving driver may be disposed on the main substrate such that an electrical distance between the driving driver and the fourth coil and an electrical distance between the driving driver and the fifth coil become similar. Therefore, because of similar noise, it is possible to easily perform correction of the driving signal. Also, it is possible to inhibit a decrease in thrust with respect to the movement of the lens unit.

The first substrate 1271 and the second substrate 1272 may be formed of a plurality of layers. For example, the first substrate 1271 and the second substrate 1272 may be composed of flexible portions 1271a and 1272a and rigid portions 1271b and 1272b. The flexible portions 1271a and 1272a may be located inward than the rigid portions 1271b and 1272b. For example, the flexible portions 1271a and 1272a may be positioned between the spaced apart rigid portions. In addition, the flexible portions 1271a and 1272a may overlap at least in part with the rigid portions 1271b and 1272b in the second direction (Y-axis direction). In addition, the rigid portions 1271b and 1272b may improve a bonding force between the housing and the first substrate 1271. Also, the rigid portions 1271b and 1272b may improve a bonding force between the housing and the second substrate 1272.

The first substrate 1271 may have a first substrate hole 1271h. The second substrate 1272 may have a second substrate hole 1272h. An adhesive member or the like may be applied in the first substrate hole 1271h and the second substrate hole 1272h. Therefore, through the first substrate hole 1271h and the second substrate hole 1272h, the first substrate 1271 and the second substrate 1272 can be easily combined with the second housing, and the position alignment can be easily achieved.

In addition, a yoke unit may be further disposed outside the second substrate unit according to an embodiment. The yoke unit may include a first yoke Y1 and a second yoke Y2. The first yoke Y1 may be located outside the first substrate 1271, and the second yoke Y2 may be located outside the second substrate 1272.

The first yoke Y1 and the second yoke Y2 can easily inhibit electromagnetic waves generated by the second driving unit from moving to the outside or block the reverse inflow and also improve a bonding force between the second driving coil and the second substrate unit. Therefore, the reliability of the camera device may be improved.

In another embodiment, at least one of the first substrate 1271 and the second substrate 1272 may be formed integrally with the main substrate. Therefore, the reliability of the second substrate unit may be improved, and the bonding force between the main substrate and the second substrate unit may be improved.

Figure 16:
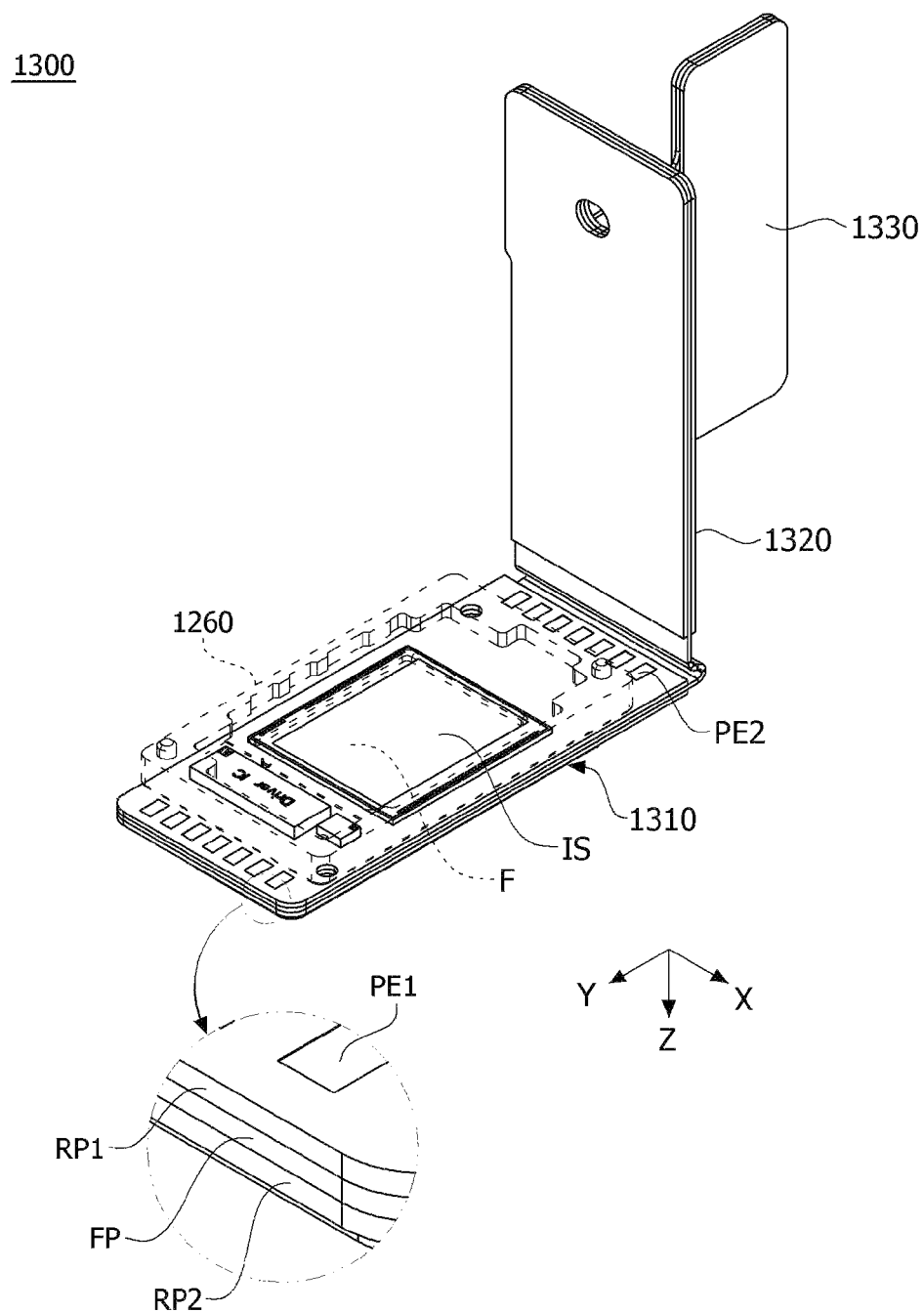
FIG. 16 is a perspective view showing a circuit board of a camera device according to an embodiment.
Figure 17:
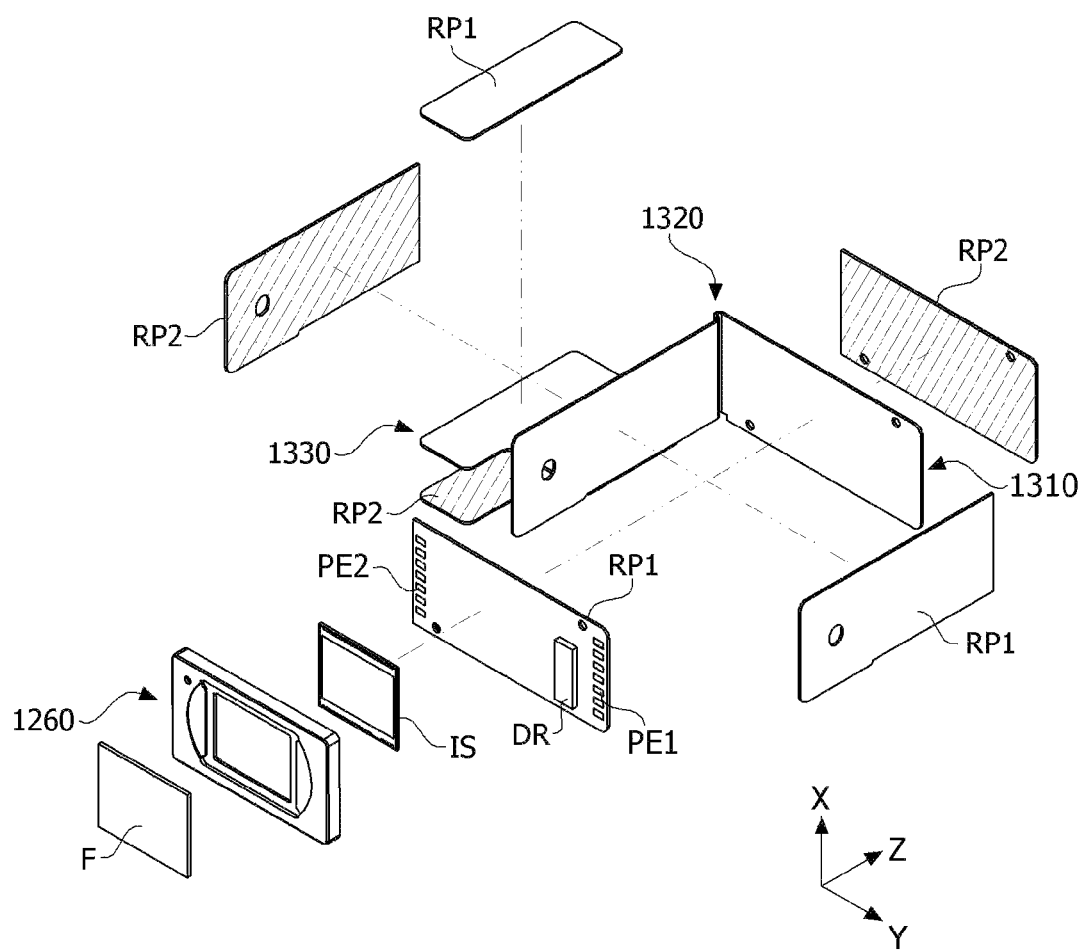
FIG. 17 is an exploded perspective view of a circuit board of a camera device according to the embodiment.
Figure 18:
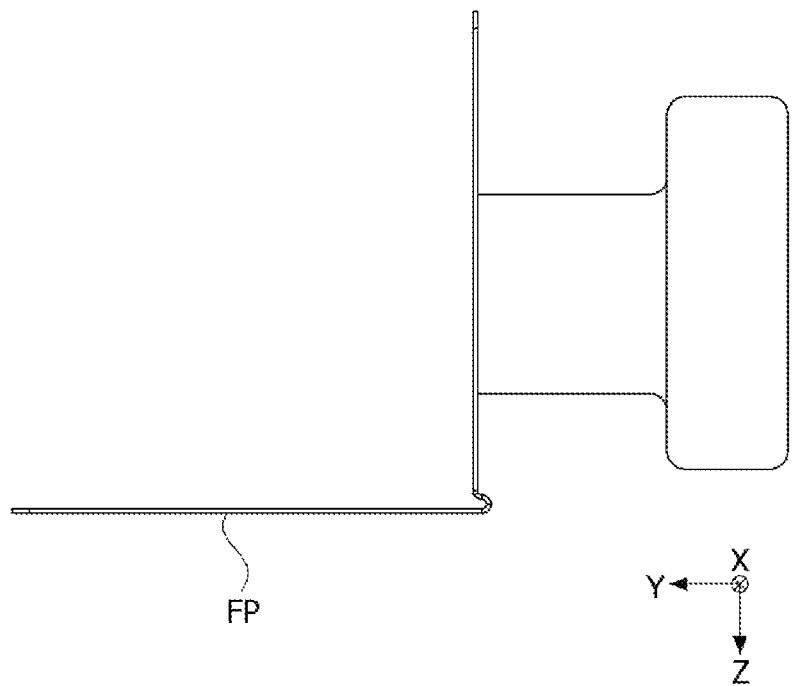
FIG. 18 is a view showing a flexible substrate unit of a circuit board of a camera device according to an embodiment.

FIG. 16 is a perspective view showing a circuit board of a camera device according to an embodiment, FIG. 17 is an exploded perspective view of a circuit board of a camera device according to the embodiment, and FIG. 18 is a view showing a flexible substrate unit of a circuit board of a camera device according to an embodiment.

The circuit board 1300 of the camera device according to an embodiment may be located at the rear of the above-described second camera actuator.

The circuit board 1300 may include a main substrate 1310, an intermediate substrate 1320, and a connection substrate 1330.

The main substrate 1310 may be positioned in the optical axis direction of the second camera actuator. The main substrate 1310 may be combined with the second camera actuator. In addition, the main substrate 1310 may be easily combined with the base unit 1260. The base unit 1260 may surround the image sensor IS and the driving driver as described above. With this configuration, the base unit 1260 can protect the image sensor IS and the driving driver, thereby improving the operational reliability of the camera device. In addition, the base unit 1260 may have a filter F placed therein, and the filter F may be positioned to overlap at least in part with the image sensor IS in the optical axis or the third direction (Z-axis direction). For example, the filter may block light in the ultraviolet wavelength band.

The image sensor IS may be disposed on the main substrate 1310. The image sensor IS may be positioned on the optical axis. In addition, the above-described driving driver may be located on the main substrate 1310. Also, various elements may be positioned on the main substrate 1310.

The main substrate 1310 may include a first substrate terminal part PE1 and a second substrate terminal part PE2 disposed on the upper surface of the main substrate 1310. A connection member may be placed on the first and second substrate terminal parts PE1 and PE2 and be in contact with the connection terminal parts. Thus, the first substrate terminal part PE1 may be electrically connected to the first connection terminal part, and the second substrate terminal part PE2 may be electrically connected to the second connection terminal part.

The first substrate terminal part PE1 and the second substrate terminal part PE2 may be located outside the base unit 1260.

The intermediate substrate 1320 may be in contact with the main substrate 1310 and be located on the side of the second housing. Therefore, the intermediate substrate 1320 may be in contact with the above-described second substrate unit. In an embodiment, the intermediate substrate 1320 may be in contact with the second substrate.

The connection substrate 1330 may be in contact with the intermediate substrate 1320 and be spaced apart from the main substrate 1310. The connection substrate 1330 may be electrically connected to an external device or other processor (e.g., a processor of a terminal). Therefore, a signal from such an external device or processor may be provided to the camera device according to an embodiment.

In addition, at least some of the main substrate 1310, the intermediate substrate 1320, and the connection substrate 1330 described above may be integrally formed. In an embodiment, the main substrate 1310, the intermediate substrate 1320, and the connection substrate 1330 may be formed of a plurality of layers.

Each of the main substrate 1310, the intermediate substrate 1320, and the connection substrate 1330 may be formed of a flexible substrate FP and rigid substrates RP1 and RP2. The flexible substrate FP may be positioned between the rigid substrates RP1 and RP2. With this configuration, the degree of freedom in shape with respect to the circuit board 1300 may be improved, and reliability may be easily secured. The flexible substrate FP and the rigid substrates RP1 and RP2 may be electrically connected to each other through a groove or a hole.

In an embodiment, the main substrate 1310, the intermediate substrate 1320, and the connection substrate 1330 may have a structure in which their flexible substrates FP are integrated. The flexible substrate FP may have a structure bent along the second substrate or the second side surface of the second housing from the lower surface of the second housing. In this case, the flexible substrate FP may have a protruding region that protrudes toward the second substrate or in the opposite direction to the second direction. Therefore, Accordingly, a bonding force and reliability between the main substrate and the intermediate substrate may be maintained.

In addition, the flexible substrate FP may extend outward from the second side surface of the second housing or the second substrate. The shape (bent position, etc.) of the circuit board 1300 may be variously changed depending on the position and structure of an external device.

Figure 19:
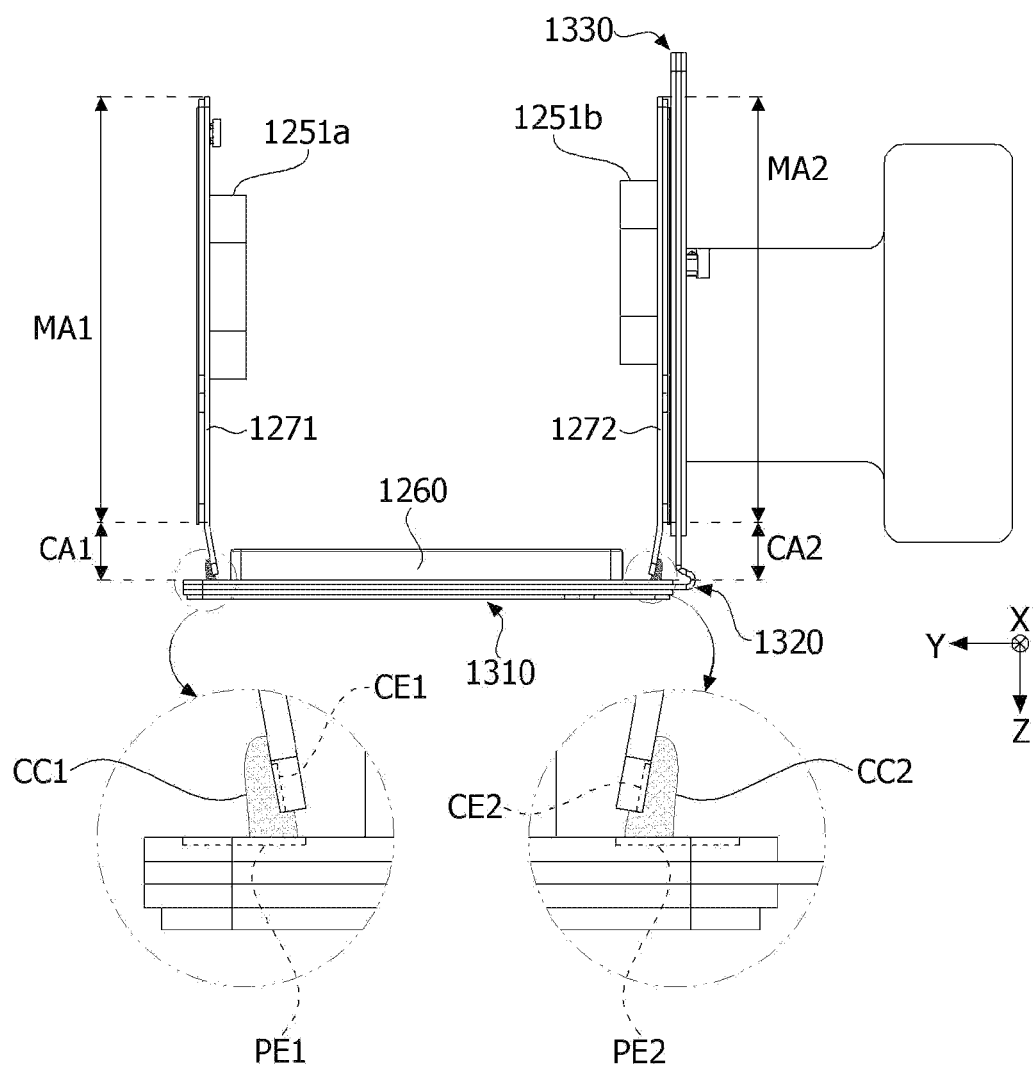
FIG. 19 is a top view showing a second driver and a circuit board.
Figure 20:
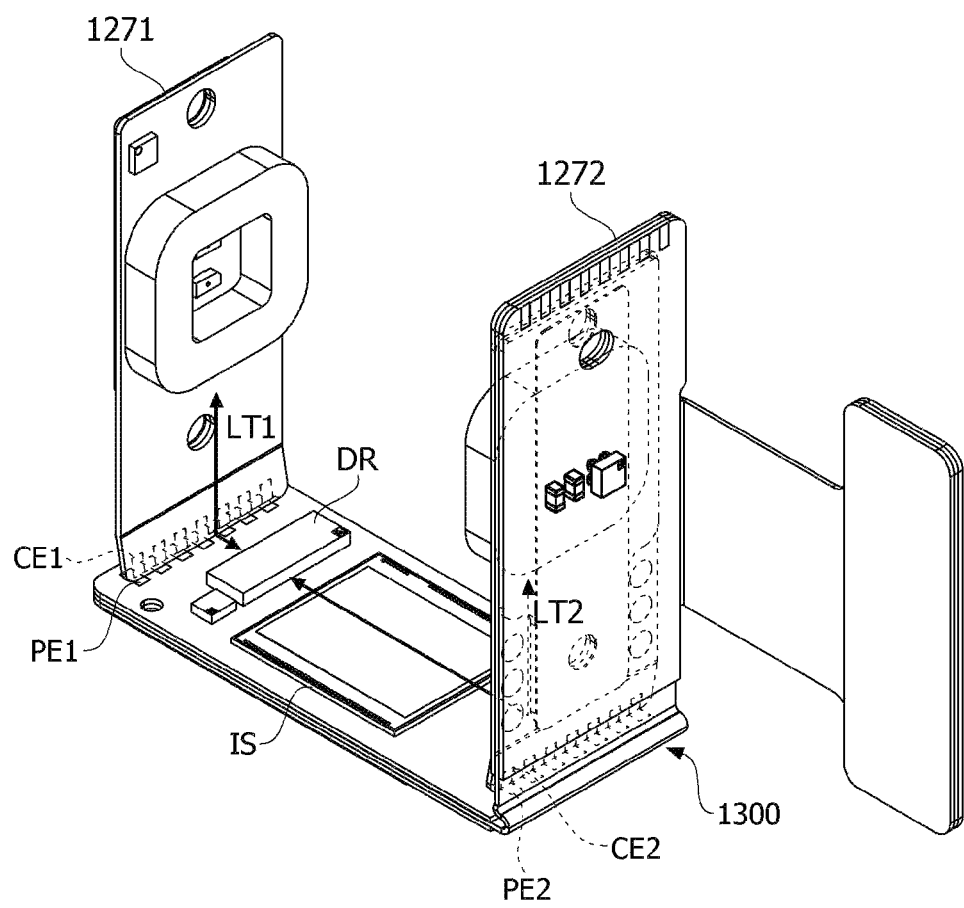
FIG. 20 is a perspective view showing a second driver and a circuit board.
Figure 21:
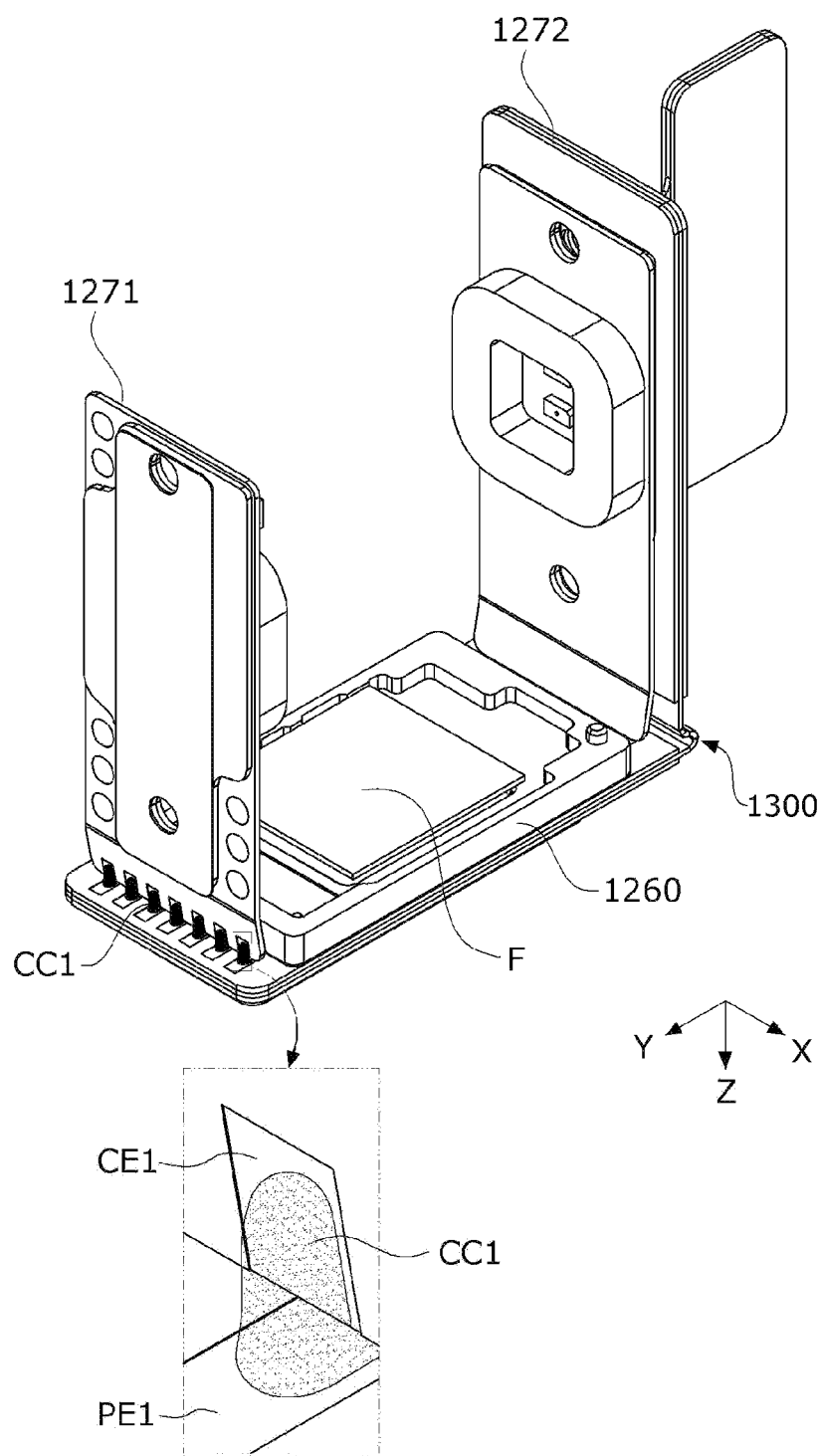
FIG. 21 is one side view showing a second driver and a circuit board.
Figure 22:
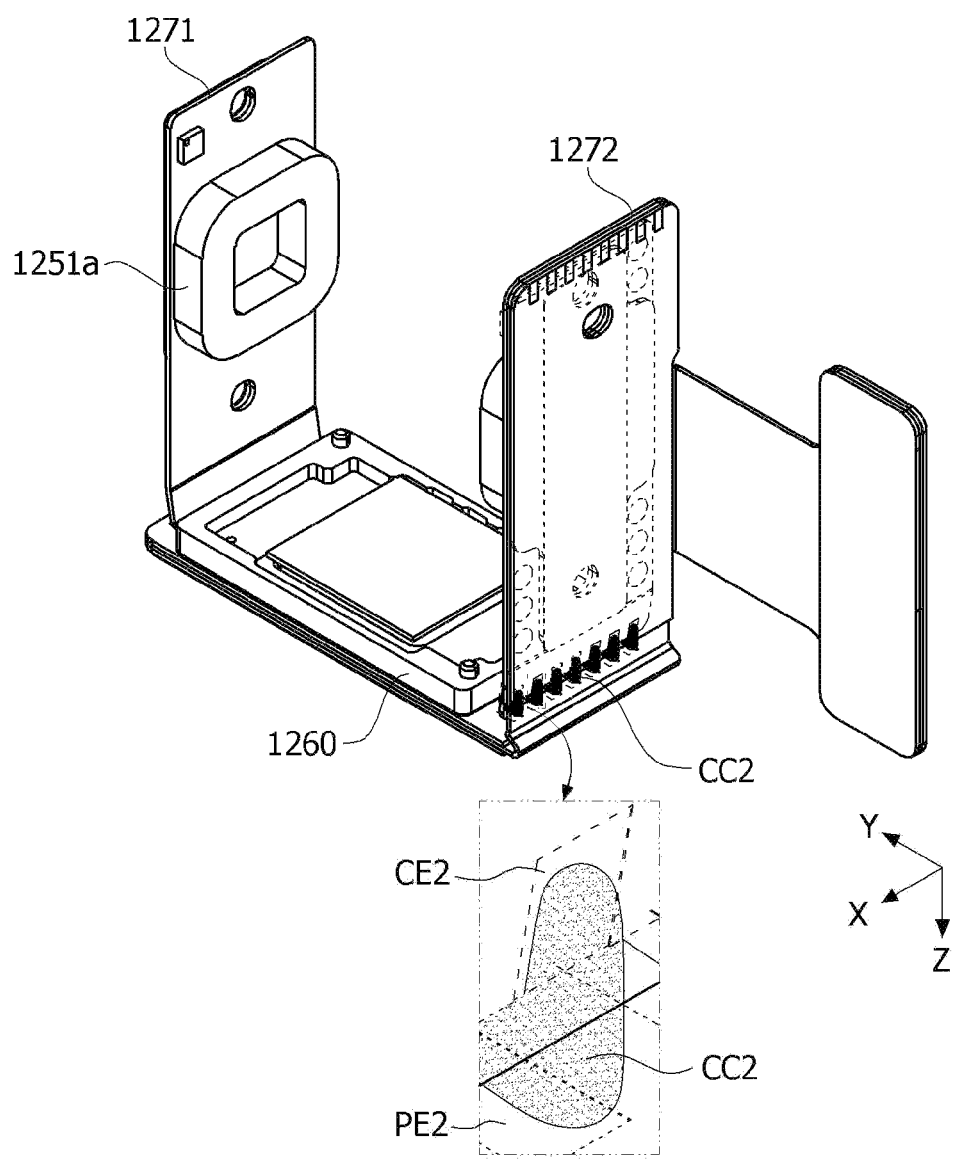
FIG. 22 is another side view showing a second driver and a circuit board.

FIG. 19 is a top view showing a second driver and a circuit board, FIG. 20 is a perspective view showing a second driver and a circuit board, FIG. 21 is one side view showing a second driver and a circuit board, and FIG. 22 is another side view showing a second driver and a circuit board.

Referring to FIGS. 19 to 22, in the camera device according to an embodiment, a driving driver DR may be provided on the circuit board 1300 or the main substrate. In addition, the driving driver DR may be electrically connected to the first coil and the second coil. In this case, the first substrate 1271 and the second substrate 1272 may be positioned at both ends of the main substrate. The first substrate 1271 and the second substrate 1272 may be spaced apart from each other at the same distance based on the center of the image sensor IS. That is, the center of the image sensor IS may halve a distance between the first substrate 1271 and the second substrate 1272.

The first substrate 1271 and the main substrate 1310 may be spaced apart from each other in the third direction (Z-axis direction). The second substrate 1272 and the main substrate 1310 may be spaced apart from each other in the third direction (Z-axis direction).

The connection member may connect the first substrate 1271 and the main substrate 1310 to each other, and connect the second substrate 1272 and the main substrate 1310 to each other.

In an embodiment, a first connection member CC1 may be positioned between the first connection terminal part CE1 and the first substrate terminal part PE1. In addition, a second connection member CC2 may be positioned between the second connection terminal part CE2 and the second substrate terminal part PE2.

Accordingly, the first substrate 1271 and the second substrate 1272 are only in contact with the first connection member CC1 and the second connection member CC2 and are not connected to each other through other components. Therefore, the second lens assembly that moves by the fourth coil 1251a connected to the first substrate 1271 and the first lens assembly that moves by the fifth coil 1251b connected to the second substrate 1272 may be aligned independently. That is, the first lens assembly may not move nor shift despite the movement or shift for alignment between the second lens assembly and the image sensor. Conversely, the second lens assembly may not move nor shift despite the movement or shift for alignment between the first lens assembly and the image sensor. As a result, the alignment is performed independently, so that the thrust loss of the second camera actuator can be minimized. Furthermore, because there is no connection between the first substrate 1271 and the second substrate 1272, a problem of increasing the thickness of the camera device due to protrusion or folding for connection may also be eliminated.

In addition, as described above, the connection member may include the first connection member CC1 disposed between the first connection terminal part CE1 and the first substrate terminal part PE1, and the second connection member CC2 disposed between the second connection terminal part CE2 and the second substrate terminal part PE2.

Also, the first connection area CA1 may overlap with the first substrate terminal part PE1. Specifically, the first connection area CA1 may overlap with the first substrate terminal part PE1 in the third direction (Z-axis direction). In other words, the first connection terminal part CE1 may overlap with the first substrate terminal part PE1 in the third direction.

Also, the second connection area CA2 may overlap with the second substrate terminal part PE2. The second connection area CA2 may overlap with the second substrate terminal part PE2 in the third direction (Z-axis direction). In other words, the second connection terminal part CE2 may overlap with the second substrate terminal part PE2 in the third direction.

With this configuration, the first connection member CC1 may be easily placed on the first substrate terminal part PE1 and may not be spread to the inwardly adjacent driving driver DR or the image sensor IS. Similarly, the second connection member CC2 may be easily placed on the second substrate terminal part PE2 and may not be spread to the inwardly adjacent driving driver DR or the image sensor IS. Therefore, the reliability of the camera device may be improved. The first connection terminal part CE1, the second connection terminal part CE2, the first substrate terminal part PE1, and the second substrate terminal part PE2 may be recesses or grooves.

Furthermore, because the driving driver DR is disposed on the main substrate 1310 as described above, a difference between an electrical distance LT1 between the driving driver DR and the fourth coil 1251a and an electrical distance LT2 between the driving driver DR and the fifth coil 1251b may be reduced compared to the case where the driving driver DR is positioned on the side of the second housing. Therefore, because the lengths of electrical paths are similar to each other, a difference in noise due to the difference in the electrical paths may be reduced, and correction for the driving signal can be easily performed.

Furthermore, because the driving driver DR is positioned to overlap with the first and second lens assemblies in the third direction, the effect of heat (heat due to operation) applied to the lens unit may be less than that of the case where it is positioned on the side. Therefore, the reliability of the camera device may be improved.

Also, in an embodiment, the first lens assembly may be positioned between the second lens assembly and the image sensor. That is, a distance between the first lens assembly and the image sensor may be smaller than a distance between the second lens assembly and the image sensor.

In addition, a first movement distance of the first lens assembly may be smaller than a second movement distance of the second lens assembly. In other words, a distance (the first moving distance) that the first lens assembly moves in the third direction or along the optical axis by the above-described electromagnetic force may be smaller than a distance (the second moving distance) that the second lens assembly moves in the third direction or along the optical axis by the above-described electromagnetic force.

Accordingly, it is difficult for the heat generated by the driving driver DR to be applied to the second lens assembly having a large movement distance and the lens group (second lens group) combined with the second lens assembly. Thus, an error in magnification adjustment in which a stroke is large compared to auto-focusing may be easily blocked. Therefore, it is possible to minimize an error due to heat generation.

Figure 23:
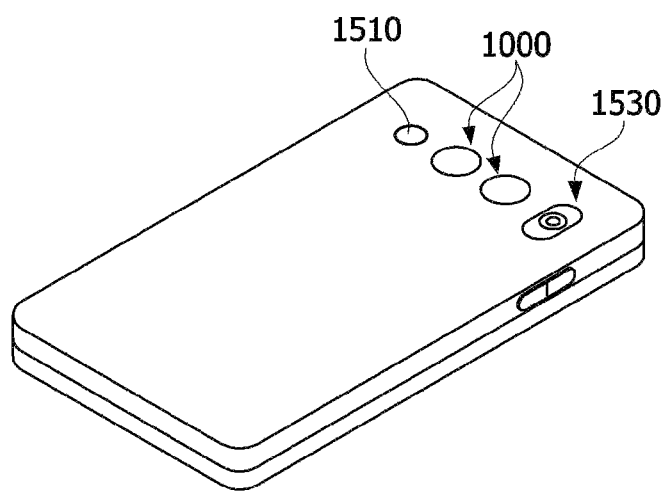
FIG. 23 is a perspective view of a mobile terminal to which a camera device according to an embodiment is applied.

FIG. 23 is a perspective view of a mobile terminal to which a camera device according to an embodiment is applied.

Referring to FIG. 23, a mobile terminal 1500 according to an embodiment may include a camera device 1000, a flash module 1530, and an auto-focus device 1510, which are provided on the rear surface thereof.

The camera device 1000 may have an image capturing function and an auto-focus function. For example, the camera device 1000 may have the auto-focus function using an image.

The camera device 1000 processes an image frame of a still image or a moving image obtained by an image sensor in a shooting mode or a video call mode.

The processed image frame may be displayed on a predetermined display unit and stored in a memory. A camera (not shown) may also be disposed on the front surface of the mobile terminal.

For example, the camera device 1000 may include a first camera device 1000 and a second camera device 1000, and the OIS may be implemented together with the AF or zoom function by the first camera device 1000

The flash module 1530 may include therein a light emitting device that emits light. The flash module 1530 may operate in response to a camera operation of the mobile terminal or a user's manipulation.

The auto-focus device 1510 may include one of packages of a surface light emitting laser device as a light emitting part.

The auto-focus device 1510 may include an auto-focusing function using a laser. The auto-focus device 1510 may be mainly used in a condition in which the auto-focusing function using the image of the camera device 1000 is deteriorated, for example, in a close environment of 10 m or less or in a dark environment.

The auto-focus device 1510 may include a light emitting unit including a vertical cavity surface emitting laser (VC- SEL) semiconductor device, and a light receiving unit such as a photodiode that converts light energy into electrical energy.

Figure 24:
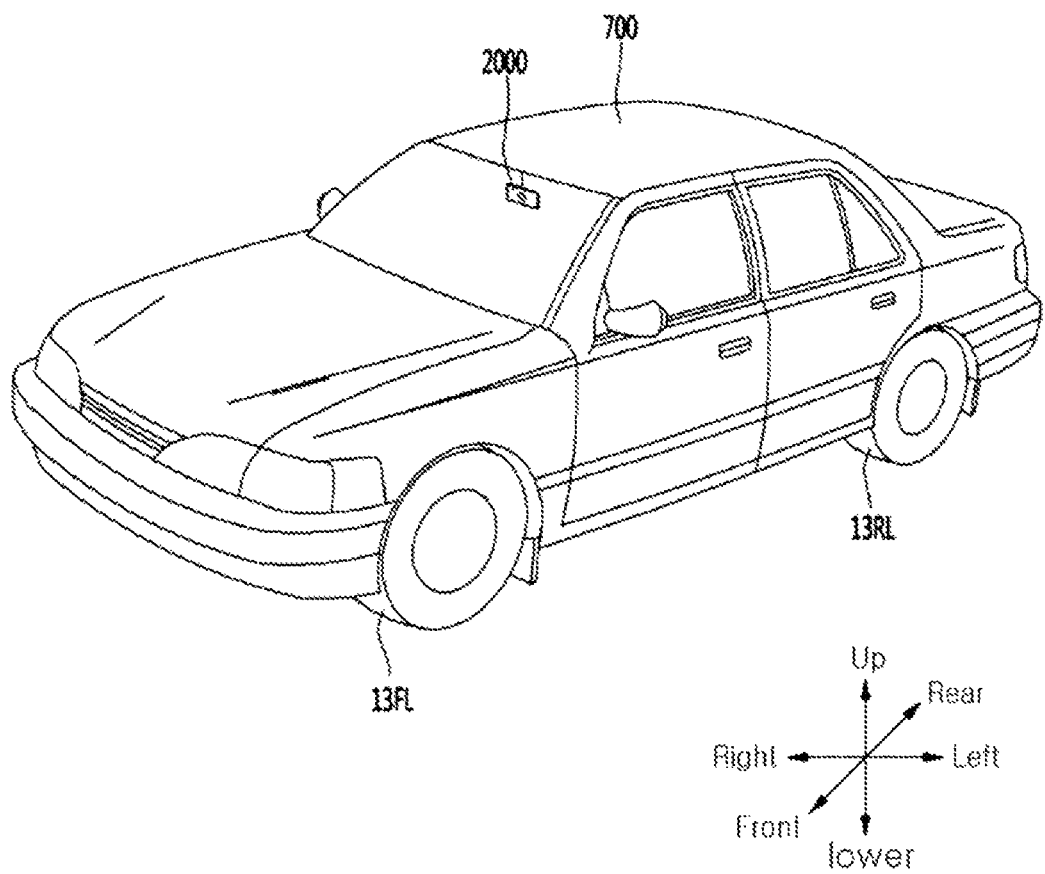
FIG. 24 is a perspective view of a vehicle to which a camera device according to an embodiment is applied.

FIG. 24 is a perspective view of a vehicle to which a camera device according to an embodiment is applied.

For example, FIG. 24 is an external view of a vehicle including a vehicle driving assistance device to which the camera device 1000 according to an embodiment is applied.

Referring to FIG. 24, a vehicle 700 according to an embodiment may include wheels 13FL and 13FR that rotate by a power source, and a predetermined sensor. The sensor may be, but is not limited to, a camera sensor 2000.

The camera sensor 2000 may be a camera sensor to which the camera device 1000 according to an embodiment is applied. The vehicle 700 of the embodiment may acquire image information through the camera sensor 2000 that captures a front image or a surrounding image, and determine a lane unidentified situation by using the image information to generate a virtual lane.

For example, the camera sensor 2000 may obtain a front image by capturing the front of the vehicle 700, and a processor (not shown) may analyze an object contained in the front image to acquire image information.

For example, if the image captured by the camera sensor 2000 contains objects such as a lane, an adjacent vehicle, a driving obstacle, and an indirect road mark such as a median, a curb, or a street tree, the processor may detect such objects and include them in the image information. In this case, the processor may acquire distance information from the object detected through the camera sensor 2000 and thereby further supplement the image information.

The image information may be information about an object captured in an image. The camera sensor 2000 may include an image sensor and an image processing module.

The camera sensor 2000 may process a still image or a moving image obtained by the image sensor (e.g., CMOS or CCD).

The image processing module may process a still image or a moving image obtained through the image sensor, extract necessary information, and transmit the extracted information to the processor.

In this case, the camera sensor 2000 may include, but is not limited to, a stereo camera to improve the object measurement accuracy and further secure information such as a distance between the vehicle 700 and the object.

Although it has been described based on embodiments so far, this is only exemplary and does not limit the present disclosure, and those of ordinary skill in the art to which the present disclosure pertains will appreciate that various modifications and applications, not described above, are possible in the scope that does not depart from the subject matter of the present disclosure. For example, the respective elements specifically shown in the embodiments may be implemented by modification. Differences related to these modifications and applications should be construed as being included in the scope of the present disclosure defined in the appended claims.

The invention claimed is:

1. A camera device comprising:
a housing;
a lens assembly including at least one lens;
a driving unit configured to move the lens assembly;
a main substrate on which an image sensor is provided; and
a first substrate and a second substrate electrically connected to the driving unit and spaced apart from each other on opposite side surfaces of the housing,
wherein the main substrate includes a first connection member connected to the first substrate and a second connection member connected to the second substrate,
wherein the first substrate comprises a first connection area inclined inward towards the lens assembly, and
wherein the second substrate comprises a second connection area inclined inward towards the lens assembly.

2. The camera device of claim 1, wherein the driving unit includes a driving coil and a driving magnet positioned to face the driving coil,
wherein the driving coil includes a first coil disposed on a first side surface of the housing, and a second coil disposed on a second side surface of the housing, and
wherein the driving magnet includes a first magnet corresponding to the first coil, and a second magnet corresponding to the second coil.

3. The camera device of claim 2, comprising:
a driving driver disposed on the main substrate,
wherein the driving driver is electrically connected to the first coil and the second coil.

4. The camera device of claim 3, comprising:
a base unit surrounding the image sensor and the driving driver on the main substrate.

5. The camera device of claim 1, wherein the lens assembly includes:
a second lens assembly; and
a first lens assembly disposed between the second lens assembly and the image sensor, and
wherein a first movement distance of the first lens assembly is greater than a second movement distance of the second lens assembly.

6. The camera device of claim 1, wherein the first connection member and the second connection member include a conductive member.

7. A camera device comprising:
a housing;
a lens assembly including at least one lens;
a driving unit configured to move the lens assembly;
a main substrate on which an image sensor is provided; and
a first substrate and a second substrate electrically connected to the driving unit and spaced apart from each other on opposite side surfaces of the housing,
wherein the main substrate includes a first connection member connected to the first substrate and a second connection member connected to the second substrate,
wherein the first substrate includes a first main area and a first connection area in contact with an end of the first main area, and
wherein the second substrate includes a second main area and a second connection area in contact with an end of the second main area.

8. The camera device of claim 7, wherein the first connection area is inclined inward with respect to the first main area,
wherein the second connection area is inclined inward with respect to the second main area, and
wherein a first separation distance between the first main area and the second main area is greater than a second separation distance between the first connection area and the second connection area.

9. The camera device of claim 7, wherein the first connection area includes a first connection terminal part disposed on an outer surface, and
wherein the second connection area includes a second connection terminal part disposed on an outer surface.

10. The camera device of claim 9, wherein the main substrate includes a first substrate terminal part and a second substrate terminal part which are disposed on an upper surface thereof, wherein the first connection area overlaps with the first substrate terminal part, and wherein the second connection area overlaps with the second substrate terminal part.

11. The camera device of claim 10, wherein the first connection member is disposed between the first connection terminal part and the first substrate terminal part, and wherein the second connection member is disposed between the second connection terminal part and the second substrate terminal part.

12. A camera device comprising:

a housing;

a lens assembly including at least one lens;

a driving unit configured to move the lens assembly;

a main substrate on which an image sensor is provided;

a first substrate and a second substrate electrically connected to the main substrate; and a driving driver disposed on the main substrate, wherein the first substrate is disposed on a first side surface of the housing, and the second substrate is disposed on a second side surface opposite to the first side surface, wherein the driving driver is electrically connected to the driving unit, wherein the first substrate comprises a first connection area inclined inward towards the lens assembly, and wherein the second substrate comprises a second connection area inclined inward towards the lens assembly.

13. The camera device of claim 12, wherein the lens assembly includes a first lens assembly and a second lens assembly, wherein the driving unit includes a first magnet disposed on one of the first lens assembly and the first substrate, and a first coil disposed on the other one of the first lens assembly and the first substrate, and wherein the driving unit includes a second magnet disposed on one of the second lens assembly and the second substrate, and a second coil disposed on the other one of the second lens assembly and the second substrate.

14. The camera device of claim 13, wherein a first movement distance of the first lens assembly is greater than a second movement distance of the second lens assembly.

15. The camera device of claim 13, wherein the driving driver is located in a region between the first substrate and the second substrate.

\* \* \* \* \*